(12) United States Patent
Deng et al.

(10) Patent No.: US 12,545,804 B2
(45) Date of Patent: Feb. 10, 2026

(54) BIOCIDAL POLYMER FOR LONG-TERM SURFACE PROTECTION

(71) Applicant: South Dakota Board of Regents, Pierre, SD (US)

(72) Inventors: Ying Deng, Sioux Falls, SD (US); Shahaboddin Saeedi, Canton, SD (US); Victor Huber, Dakota Dunes, SD (US)

(73) Assignee: South Dakota Board of Regents

( * ) Notice: Subject to any disclaimer, the term of this patent is extended or adjusted under 35 U.S.C. 154(b) by 355 days.

(21) Appl. No.: 18/450,891

(22) Filed: Aug. 16, 2023

(65) Prior Publication Data

US 2024/0067843 A1    Feb. 29, 2024

Related U.S. Application Data

(60) Provisional application No. 63/398,346, filed on Aug. 16, 2022.

(51) Int. Cl.
| | |
|---|---|
| *C09D 133/16* | (2006.01) |
| *C08F 220/34* | (2006.01) |
| *C09D 5/14* | (2006.01) |
| *C09D 5/33* | (2006.01) |
| *C09D 7/65* | (2018.01) |

(52) U.S. Cl.
CPC .......... *C09D 133/16* (2013.01); *C08F 220/34* (2013.01); *C09D 5/004* (2013.01); *C09D 5/14* (2013.01); *C09D 7/65* (2018.01)

(58) Field of Classification Search
CPC ........ C09D 133/16; C09D 5/004; C09D 5/14; C09D 7/65; C08F 220/34; C08F 226/02
See application file for complete search history.

(56) References Cited

U.S. PATENT DOCUMENTS

| | | |
|---|---|---|
| 3,925,310 A | 12/1975 | Wolf et al. |
| 6,294,185 B1 | 9/2001 | Worley et al. |
| 8,496,920 B2 | 7/2013 | Worley et al. |
| 8,821,907 B2 | 9/2014 | Worley et al. |
| 10,138,379 B2 | 11/2018 | Sun et al. |
| 10,178,866 B2 | 1/2019 | Worley et al. |

(Continued)

FOREIGN PATENT DOCUMENTS

| | | |
|---|---|---|
| WO | WO-2019246123 A1 | 12/2019 |
| WO | WO-2021231711 A1 | 11/2021 |

OTHER PUBLICATIONS

Cerkez, I., et al., N-halamine copolymers for biocidal coatings. Reactive and Functional Polymers, 2012. 72(10): p. 673-679.

(Continued)

*Primary Examiner* — Michael B Nelson
(74) *Attorney, Agent, or Firm* — Wilson Sonsini Goodrich & Rosati

(57) ABSTRACT

The present disclosure is directed to compositions, methods, and treated surfaces that comprise a co-polymer composition comprising a rechargeable N-halamine moiety and one or more monomers. The compositions are pre-halogenated for providing a single step application for antimicrobial use without the need for a subsequent chlorine application for activation of antimicrobial properties. The copolymers provide for effective and rapid inactivation of bacteria and viruses, with improved solubility and stability.

20 Claims, 16 Drawing Sheets

(56) References Cited

U.S. PATENT DOCUMENTS

| | | | | |
|---|---|---|---|---|
| 2004/0063831 | A1* | 4/2004 | Sheppard | C09D 7/65 524/115 |
| 2009/0324536 | A1* | 12/2009 | Sun | C08F 8/20 514/315 |
| 2019/0269136 | A1 | 9/2019 | Wynne et al. | |
| 2021/0267200 | A1 | 9/2021 | Ma et al. | |
| 2023/0165250 | A1 | 6/2023 | Qiao | |

OTHER PUBLICATIONS

Dong, A., et al., Modifying Fe304-functionalized nanoparticles with N-halamine and their magnetic/antibacterial properties. ACS Applied Materials & Interfaces, 2011. 3(11): p. 4228-4235.

Liang, M., et al., N-halamine functionalized electrospun poly (vinyl alcohol-co-ethylene) nanofibrous membranes with rechargeable antibacterial activity for bioprotective applications. Advanced Fiber Materials, 2019. 1(2): p. 126-136.

Saeedi, S., Tuning Interaction of Synthetic and Biological Materials by Their Surface Modification. 2020, University of South Dakota.

Sun, Y. and G. Sun, Durable and refreshable polymeric N-halamine biocides containing 3-(4'-vinylbenzyl)-5, 5-dimethylhydantoin. Journal of Polymer Science Part A: Polymer Chemistry, 2001. 39(19): p. 3348-3355.

Zhang, S., et al., Preparation, characterization and antibacterial properties of cellulose membrane containing N-halamine. Cellulose, 2019. 26(9): p. 5621-5633.

Chen, Y., et al., Novel composite unit with one pyridinium and three N-halamine structures for enhanced synergism and superior biocidability on magnetic nanoparticles. Colloids and Surfaces B: Biointerfaces, 2020. 190: p. 110890.

Zuo, M., et al., Antibacterial Chitosan Hybrid Films with N-Halamine-Functionalized Graphene Oxide. Nano, 2020. 15 (02): p. 2050027.

Bai, R., et al., N-halamine-containing electrospun fibers kill bacteria via a contact/release co-determined antibacterial pathway. ACS Applied Materials & Interfaces, 2016. 8(46): p. 31530-31540.

Eleraky, N.E., et al., Nanomedicine fight against antibacterial resistance: an overview of the recent pharmaceutical innovations. Pharmaceutics, 2020. 12(2): p. 142.

Luo, J., Z. Chen, and Y. Sun, Controlling biofilm formation with an n-halamine-based polymeric additive. Journal of Biomedical Materials Research Part A: An Official Journal of The Society for Biomaterials, The Japanese Society for Biomaterials, and The Australian Society for Biomaterials and the Korean Society for Biomaterials, 2006. 77(4): p. 823-831.

Buffet-Bataillon, S., et al., Emergence of resistance to antibacterial agents: the role of quaternary ammonium compounds—a critical review. International journal of antimicrobial agents, 2012. 39(5): p. 381-389.

Health Care-Associated Infections Fact Sheet. 2015, World Health Organization.

CDC, Hospital Acquired Infections Fact Sheet. CDC.

Sun, Y., et al., Novel refreshable N-halamine polymeric biocides containing imidazolidin-4-one derivatives. Journal of Polymer Science Part A: Polymer Chemistry, 2001. 39(18): p. 3073-3084.

Liu, C., et al., Novel inorganic-based N-halamine nanofibrous membranes as highly effective antibacterial agent for water disinfection. ACS applied materials & interfaces, 2018. 10(51): p. 44209-44215.

Bahrami, A., R. Delshadi, and S.M. Jafari, Active delivery of antimicrobial nanoparticles into microbial cells through surface functionalization strategies. Trends in Food Science & Technology, 2020. 99: p. 217-228.

Bai, R., et al., Novel N—Br bond-containing N-halamine nanofibers with antibacterial activities. ACS Biomaterials Science & Engineering, 2018. 4(6): p. 2193-2202.

American Hospital Association. Available from: https://www.ashe.org.

Kocer, H.B., et al., N-halamine copolymers for use in antimicrobial paints. ACS applied materials & interfaces, 2011. 3 (8): p. 3189-3194.

Liu, Y., et al., Self-assembled antibacterial coating by N-halamine polyelectrolytes on a cellulose substrate. Journal of Materials Chemistry B, 2015. 3(7): p. 1446-1454.

Chen, Z. and Y. Sun, N-halamine-based antimicrobial additives for polymers: preparation, characterization, and antimicrobial activity. Industrial & engineering chemistry research, 2006. 45(8): p. 2634-2640.

Sun, Y. and G. Sun, Novel regenerable N-halamine polymeric biocides. I. Synthesis, characterization, and antibacterial activity of hydantoin-containing polymers. Journal of applied polymer science, 2001. 80(13): p. 2460-2467.

CDC Report on Burden of Foodborne Illnesses.

FDA Report on Most Common Foodborne Illnesses.

USDA Report on Economic Burden of Major Foodborne Illnesses Acquired in the United States.

Quinlan, J.J., Foodborne illness incidence rates and food safety risks for populations of low socioeconomic status and minority race/ethnicity: a review of the literature. Int J Environ Res Public Health, 2013. 10(8): p. 3634-52.

Mann-Wood, A., Urban vs. Rural Sustainability within the Food System. 2018.

CDC Report on Zoonotic Diseases in Rural America.

CDC Report on Antibiotic Resistance, Food, and Food Animals.

CDC Report on Challenges in Food Safety.

Spitz, M.G., et al., Soldier Hygiene Issues and Use of Antimicrobial Textiles in the Military. AATCC Journal of Research, 2016. 3(5): p. 27-37.

Broad Agency Announcement (BAA) for Basic and Applied Research. 2022.

Fundamental Research to Counter Weapons of Mass Destruction (C-WMD), R.a.D.D.-E.C.D. (RD-EC), Editor. 2022.

CDC Report on Chemical Disinfectants.

Muñoz-Bonilla, A. and M. Fernandez-Garcia, Polymeric materials with antimicrobial activity. Progress in Polymer Science, 2012. 37(2): p. 281-339.

Sidhu, M.S., H. Sørum, and A. Holck, Resistance to quaternary ammonium compounds in food-related bacteria. Microbial Drug Resistance, 2002. 8(4): p. 393-399.

Gottenbos, B., et al., Antimicrobial effects of positively charged surfaces on adhering Gram-positive and Gram-negative bacteria. Journal of antimicrobial chemotherapy, 2001. 48(1): p. 7-13.

Anderson, E.B. and T.E. Long, Imidazole-and imidazolium-containing polymers for biology and material science applications. Polymer, 2010. 51(12): p. 2447-2454.

Xing, C., et al., Conjugated polymer/porphyrin complexes for efficient energy transfer and improving light-activated antibacterial activity. Journal of the American Chemical Society, 2009. 131(36): p. 13117-13124.

Mizerska, U., et al., Polysiloxane cationic biocides with imidazolium salt (ImS) groups, synthesis and antibacterial properties. European Polymer Journal, 2009. 45(3): p. 779-787.

Chen, C.Z. and S.L. Cooper, Recent advances in antimicrobial dendrimers. Advanced Materials, 2000. 12(11): p. 843-846.

Chen, C.Z., et al., Quaternary ammonium functionalized poly (propylene imine) dendrimers as effective antimicrobials: Structure-activity studies. Biomacromolecules, 2000. 1(3): p. 473-480.

Chen, C.Z. and S.L. Cooper, Interactions between dendrimer biocides and bacterial membranes. Biomaterials, 2002. 23(16): p. 3359-3368.

Zhang, Y., J. Jiang, and Y. Chen, Synthesis and antimicrobial activity of polymeric guanidine and biguanidine salts. Polymer, 1999. 40(22): p. 6189-6198.

Feiertag, P., et al., Structural characterization of biocidal oligoguanidines. Macromolecular rapid communications, 2003. 24(9): p. 567-570.

Albert, M., et al., Structure-activity relationships of oligoguanidines influence of counterion, diamine, and average molecular weight on biocidal activities. Biomacromolecules, 2003. 4(6): p. 1811-1817.

Eschenauer, G., D.D. DePestel, and P.L. Carver, Comparison of echinocandin antifungals. Therapeutics and clinical risk management, 2007. 3(1): p. 71.

(56) References Cited

OTHER PUBLICATIONS

Leonard, W.R., et al., Synthesis of the antifungal ß-1, 3-glucan synthase inhibitor CANCIDAS (caspofungin acetate) from pneumocandin BO. The Journal of organic chemistry, 2007. 72(7): p. 2335-2343.
Bouffard, F.A., et al., Synthesis and antifungal activity of novel cationic pneumocandin Bo derivatives. Journal of medicinal chemistry, 1994. 37(2): p. 222-225.
Kocer, H.B., et al., A novel N-halamine acrylamide monomer and its copolymers for antimicrobial coatings. Reactive and Functional Polymers, 2011. 71(5): p. 561-568.
Ren, X., et al., N-Halamine-coated cotton for antimicrobial and detoxification applications. Carbohydrate Polymers, 2009. 78(2): p. 220-226.
Yin, M., et al., Novel quaternarized N-halamine chitosan and polyvinyl alcohol nanofibrous membranes as hemostatic materials with excellent antibacterial properties. Carbohydrate polymers, 2020. 232: p. 115823.
Li, R., et al., Antimicrobial N-halamine modified chitosan films. Carbohydrate polymers, 2013. 92(1): p. 534-539.
Kou, L., et al., Novel N-halamine silanes. Colloids and Surfaces A: Physicochemical and Engineering Aspects, 2009. 345(1-3): p. 88-94.
Eknoian, M. and S. Worley, New N-halamine biocidal polymers. Journal of bioactive and compatible polymers, 1998. 13(4): p. 303-314.
Liang, J., et al., N-halamine/quat siloxane copolymers for use in biocidal coatings. Biomaterials, 2006. 27(11): p. 2495-2501.
Strategy Unit, C.f.D.C.a.P.U.S.N.C.f.E.Z.a.I.D.U.S.D.o.H.Q.P.A.R.C.a., Antibiotic resistance threats in the United States. 2019.
Liang, J., et al., Fabric treated with antimicrobial N-halamine epoxides. Industrial & Engineering Chemistry Research, 2007. 46(20): p. 6425-6429.
Tsao, T.C., et al., Novel N-Halamine Disinfectant Compounds. Biotechnology Progress, 1991. 7(1): p. 60-66.
Liu, S. and G. Sun, Durable and regenerable biocidal polymers: acyclic N-halamine cotton cellulose. Industrial & engineering chemistry research, 2006. 45(19): p. 6477-6482.
Zhang, S., et al., Synthesis of antibacterial N-halamine acryl acid copolymers and their application onto cotton. Journal of Applied Polymer Science, 2019. 136(16): p. 47426.
Zuo, M., et al., Three-dimensionally printed polylactic acid/cellulose acetate scaffolds with antimicrobial effect. RSC advances, 2020. 10(5): p. 2952-2958.
Liang, J., et al., N-halamine biocidal coatings. Journal of Industrial Microbiology and Biotechnology, 2007. 34(2): p. 157-163.
Sun, Y. and G. Sun, Novel regenerable N-halamine polymeric biocides. II. grafting hydantoin-containing monomers onto cotton cellulose. Journal of applied polymer science, 2001. 81(3): p. 617-624.
Kang, B., et al., Novel PVDF hollow fiber ultrafiltration membranes with antibacterial and antifouling properties by embedding N-halamine functionalized multi-walled carbon nanotubes (MWNTs). RSC advances, 2016. 6(3): p. 1710-1721.
Tang, X., et al., Porous antimicrobial starch particles containing N-halamine functional groups. Carbohydrate Polymers, 2020. 229: p. 115546.
Dong, A., et al., Synthesis of N-halamine-functionalized silica-polymer core-shell nanoparticles and their enhanced antibacterial activity. Nanotechnology, 2011. 22(29): p. 295602.
Cao, Z. and Y. Sun, N-halamine-based chitosan: Preparation, characterization, and antimicrobial function. Journal of Biomedical Materials Research Part A: An Official Journal of The Society for Biomaterials, The Japanese Society for Biomaterials, and The Australian Society for Biomaterials and the Korean Society for Biomaterials, 2008. 85(1): p. 99-107.
Ren, X., et al., Antimicrobial efficacy and light stability of N-halamine siloxanes bound to cotton. Cellulose, 2008. 15(4): p. 593-598.
Verma, N., et al., Antimicrobial nanomaterials for water disinfection, in Nanotoxicity. 2020, Elsevier. p. 365-383.
Qiao, M., et al., Scalable and rechargeable antimicrobial coating for food safety applications. Journal of agricultural and food chemistry, 2018. 66(43): p. 11441-11450.
Wang, J., Wang, L., Wu, C., Pei, X., Cong, Y., Zhang, R. and Fu, J., Antibacterial zwitterionic polyelectrolyte hydrogel adhesives with adhesion strength mediated by electrostatic mismatch. ACS Applied Materials & Interfaces, 2020. 12 (41): p. 46816-46826.
Su, W.-F., Chain Copolymerization, in Principles of Polymer Design and Synthesis. 2013, Springer Berlin Heidelberg: Berlin, Heidelberg. p. 233-265.
Duarte, K., Justino, C.I.L., Gomes, A.M., Rocha-Santos, T. and Duarte, A.C., Green analytical methodologies for preparation of extracts and analysis of bioactive compounds. In Comprehensive analytical chemistry, in Comprehensive analytical chemistry. 2014. p. 59-78.
Jung, M.R., et al., Validation of Atr Ft-Ir to identify polymers of plastic marine debris, including those ingested by marine organisms. Marine Pollution Bulletin, 2018. 127: p. 704-716.
Ding, X., et al., Biological Effects of Titanium Surface Charge with a Focus on Protein Adsorption. ACS omega, 2020. 5 (40): p. 25617-25624.
Worley, S.D., et al., N-halamine acrylamide monomers and copolymers thereof for biocidal coatings. 2013, Google Patents.
ASTM, D., Standard practice for testing water resistance of coatings in 100% relative humidity. 2002.
Zambias, R.A., et al., Lipopeptide antifungal agents: amine conjugates of the semi-synthetic pneumocandins L-731,373 and L-733,560. Bioorganic & Medicinal Chemistry Letters, 1997. 7(15): p. 2021-2026.
Chen, L., et al., Engineering of Glarea lozoyensis for exclusive production of the pneumocandin B0 precursor of the antifungal drug caspofungin acetate. Applied and environmental microbiology, 2015. 81(5): p. 1550-1558.
Marr, A.K., W.J. Gooderham, and R.E. Hancock, Antibacterial peptides for therapeutic use: obstacles and realistic outlook. Current opinion in pharmacology, 2006. 6(5): p. 468-472.
Halevy R, R.A., Kolusheva S, Hancock REW, Jelinek R., Membrane binding and permeation by indolicidin analogs studied by a biomimetic lipid/polydiacetylene vesicle assay. Peptides, 2003. 24: p. 1753-61.
Tamaki M, K.M., Sasaki I, Suzuki Y, Iwama M, Saegusa K, and S.M. Kikuchi Y, Kimura M, Uchida Y, Syntheses of lowhemolytic antimicrobial gratisin peptides. Bioorg Med Chem Lett, 2009. 19: p. 2856-9.
Béven L, C.S., Dufourcq J, Wieslander Å, Wróblewski H, The antibiotic activity of cationic linear amphipathic peptides: lessons from the action of leucine/lysine copolymers on bacteria of the class Mollicutes. Eur J Biochem, 2003. 270: p. 2207-17.
Moon WS, K.J., Chung KH, Park ES, Kim MN, Yoon JS, Antimicrobial activity of a monomer and its polymer based on quinolone. J Appl Polym Sci, 2003. 90: p. 1797-801.
Kugel AJ, J.L., Daniels JW, Wal LJV, Ebert SM, Jepperson and S.S. MJ, Pieper RJ, Webster DC, Bahr J, Chisholm BJ, Combinatorial materials research applied to the development of new surface coatings XII: novel, environmentally friendly antimicrobial coatings derived from biocide-functional acrylic polyols and isocyanates. J Coat Technol Res, 2009. 6: p. 107-21.
Kenawy, E.R., et al., Biologically active polymers. V. Synthesis and antimicrobial activity of modified poly (glycidyl methacrylate-co-2-hydroxyethyl methacrylate) derivatives with quaternary ammonium and phosphonium salts. Journal of Polymer Science Part A: Polymer Chemistry, 2002. 40(14): p. 2384-2393.
Kenawy, E.R. and Y.A.G. Mahmoud, Biologically active polymers, 6. Macromolecular Bioscience, 2003. 3(2): p. 107-116.
Kenawy, E.-R., et al., Biologically active polymers: VII. Synthesis and antimicrobial activity of some crosslinked copolymers with quaternary ammonium and phosphonium groups. Reactive and Functional Polymers, 2006. 66(4): p. 419-429.
Kenawy, E.R., et al., Biologically active polymers. IV. Synthesis and antimicrobial activity of tartaric acid polyamides. Journal of applied polymer science, 2006. 102(5): p. 4780-4790.
Mahmoud, Y.A.-G. and M.M. Aly, Anti-Candida and mode of action of two newly synthesized polymers: a modified poly

(56) References Cited

OTHER PUBLICATIONS (methylmethacrylate-co-vinylbenzoylchloride) and a modified linear poly (chloroethylvinylether-co-vinylbenzoylchloride) with special reference to *Candida albicans* and *Candida tropicalis*. Mycopathologia, 2004. 157(2): p. 145-153.
Zaneveld, L.J., et al., Efficacy and safety of a new vaginal contraceptive antimicrobial formulation containing high molecular weight poly (sodium 4-styrenesulfonate). Biology of Reproduction, 2002. 66(4): p. 886-894.
Cheng, G., et al., Zwitterionic carboxybetaine polymer surfaces and their resistance to long-term biofilm formation. Biomaterials, 2009. 30(28): p. 5234-5240.
Park, E.-S., et al., Antimicrobial activity of phenol and benzoic acid derivatives. International biodeterioration & biodegradation, 2001. 47(4): p. 209-214.
Kenawy, E.R. and Y.R. Abdel-Fattah, Antimicrobial properties of modified and electrospun poly (vinyl phenol). Macromolecular bioscience, 2002. 2(6): p. 261-266.
Subramanyam, E., S. Mohandoss, and H.W. Shin, Synthesis, characterization, and evaluation of antifouling polymers of 4-acryloyloxybenzaldehyde with methyl methacrylate. Journal of applied polymer science, 2009. 112(5): p. 2741-2749.
Carraher CE, S.T., Roner MR, Shahi K, Bleicher RE, Roehr JL, Bassett KD, Synthesis of organotin polyamine ethers containing acyclovir and their preliminary anticancer and antiviral activity. J Inorg Organomet Polym, 2006. 16: p. 249-57.
Nishat N, A.S., Ahamad T, Synthesis, characterization, and antimicrobial studies of newly developed metal-chelated epoxy resins. J Appl Polym Sci, 2006. 101: p. 1347-55.
Ahamad T, N.N., New antimicrobial epoxy-resin-bearing Schiffbase metal complexes. J Appl Polym Sci, 2008. 107: p. 2280-8.
Kong, H. and J. Jang, Synthesis and antimicrobial properties of novel silver/polyrhodanine nanofibers. Biomacromolecules, 2008. 9(10): p. 2677-2681.
Kong H, S.J., Jang J, One-step preparation of antimicrobial polyrhodanine nanotubes with silver nanoparticles. Macromol Rapid Commun, 2009. 30: p. 1350-5.
Perkas N, A.G., Dubinsky S, Gazit S, Gedanken A, Ultrasound-assisted coating of nylon 6,6 with silver nanoparticles and its antibacterial activity. J Appl Polym Sci, 2007. 104: p. 1423-30.
Dvoracek, C.M., Sukhonosova, G., Benedik, M.J. and Grunlan, J.C., ntimicrobial behavior of polyelectrolyte-surfactant thin film assemblies. Langmuir, 2009. 25(17): p. 10322-10328.
Grunlan, J.C., Choi, J.K. and Lin, A, Antimicrobial behavior of polyelectrolyte multilayer films containing cetrimide and silver. Biomacromolecules, 2005. 6(2): p. 1149-1153.
Carp, O., Huisman, C.L. and Reller, A., Photoinduced reactivity of titanium dioxide. Progress in solid state chemistry, 2004. 32(1-2): p. 33-17.
Rennie, R.P., Current and future challenges in the development of antimicrobial agents. Antibiotic resistance, 2012: p. 45-65.
Cao, Z.B. and Y.Y. Sun, Polymeric N-Halamine Latex Emulsions for Use in Antimicrobial Paints. Acs Applied Materials & Interfaces, 2009. 1(2): p. 494-504.
Pestka, J.J., et al., Stachybotrys chartarum, trichothecene mycotoxins, and damp building-related illness: New insights into a public health enigma. Toxicological Sciences, 2008. 104(1): p. 4-26.
Lieberman, A., W. Rea, and L. Curtis, Adverse health effects of indoor mold exposure. Journal of allergy and clinical immunology, 2006. 118(3): p. 763.

Menetrez, M.Y., et al., Testing antimicrobial paint efficacy on gypsum wallboard contaminated with Stachybotrys chartarum. Journal of Occupational and Environmental Hygiene, 2008. 5(2): p. 63-66.
Ren, X., et al., Antimicrobial coating of an N-halamine biocidal monomer on cotton fibers via admicellar polymerization. Colloids and Surfaces A: Physicochemical and Engineering Aspects, 2008. 317(1-3): p. 711-716.
Eknoian, M., et al., Novel antimicrobial N-halamine polymer coatings generated by emulsion polymerization. Polymer, 1999. 40(6): p. 1367-1371.
Zhang, L., et al., Multilayer electrospun nanofibrous membranes with antibacterial property for air filtration. Applied Surface Science, 2020. 515: p. 145962.
Liu, Y., et al., Antimicrobial cotton containing N-halamine and quaternary ammonium groups by grafting copolymerization. Applied Surface Science, 2014. 296: p. 231-236.
Zhang, M., et al., Antibacterial Finishing of Vat Dyed Cotton Fabrics with a Reactive N-Halamine. AATCC Journal of Research, 2020. 7(2): p. 13-18.
Sun, Y. and G. Sun, Novel refreshable N-halamine polymeric biocides: N-chlorination of aromatic polyamides. Industrial & engineering chemistry research, 2004. 43(17): p. 5015-5020.
Cao, Z. and Y. Sun, Polymeric N-halamine latex emulsions for use in antimicrobial paints. ACS applied materials & interfaces, 2009. 1(2): p. 494-504.
Liang, J., et al., Biocidal hydantoinylsiloxane polymers. IV. N-halamine siloxane-functionalized silica gel. Journal of applied polymer science, 2006. 101(5): p. 3448-3454.
Gelber, C. and S. Margel, Synthesis and Characterization of Free and Grafted N-Halamine Nanoparticles for Decomposition of Organic Dyes in an Aqueous Continuous Phase. ACS omega, 2020. 5(8): p. 4004-4013.
Tavakolian, M., S.M. Jafari, and T.G. van de Ven, A review on surface-functionalized cellulosic nanostructures as biocompatible antibacterial materials. Nano-Micro Letters, 2020. 12(1): p. 1-23.
Demir, B., et al., N-halamine biocidal materials with superior antimicrobial efficacies for wound dressings. Molecules, 2017. 22(10): p. 1582.
Cerkez, I., et al., N-halamine biocidal coatings via a layer-by-layer assembly technique. Langmuir, 2011. 27(7): p. 4091-4097.
Chien, H.-W. and T.-H. Chiu, Stable N-halamine on polydopamine coating for high antimicrobial efficiency. European Polymer Journal, 2020. 130: p. 109654.
Chen, Y., et al., Engineering of antibacterial/recyclable difunctional nanoparticles via synergism of quaternary ammonia salt site and N-halamine sites on magnetic surface. Colloids and Surfaces B: Biointerfaces, 2020. 187: p. 110642.
Liu, J., et al., Synthesis of a novel N-halamine-based cyclic polysiloxane and its antibacterial application on cotton fabrics. Fibers and Polymers, 2020. 21(2): p. 273-281.
Kang, J., et al., Unexpected enhancement in antibacterial activity of N-halamine polymers from spheres to fibers. ACS applied materials & interfaces, 2015. 7(31): p. 17516-17526.
Liu, Y., et al., Antibacterial cotton treated with N-halamine and quaternary ammonium salt. Cellulose, 2013. 20(6): p. 3123-3130.
Chen, Y., et al., Novel quat/di-N-halamines silane unit with enhanced synergism polymerized on cellulose for development of superior biocidability. International Journal of Biological Macromolecules, 2020. 154: p. 173-181.
Kocer. Residual disinfection with N-halamine based antimicrobial paints. Progress in Organic Coatings 74:100-105 (2012).
Yong, You. et al. Conformal hydrogel coatings on catheters to reduce biofouling. Langmuir 35(5):1927-1934 (2019).

\* cited by examiner

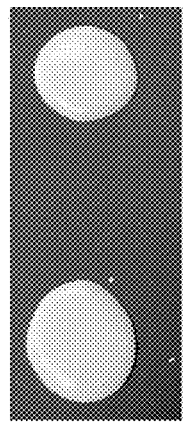 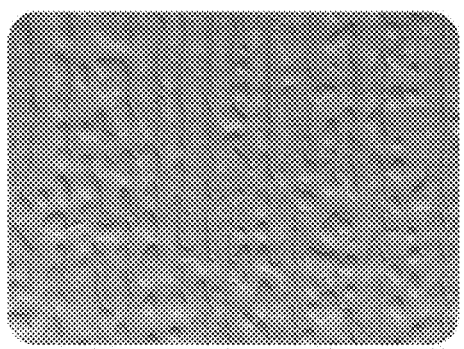 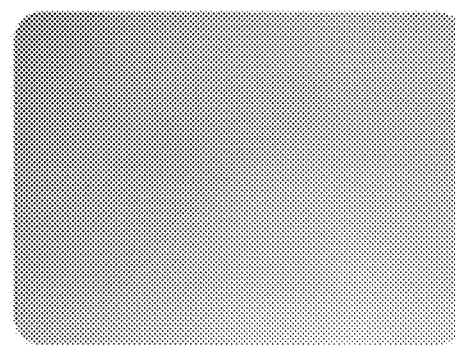
FIG. 10A  FIG. 10B  FIG. 10C
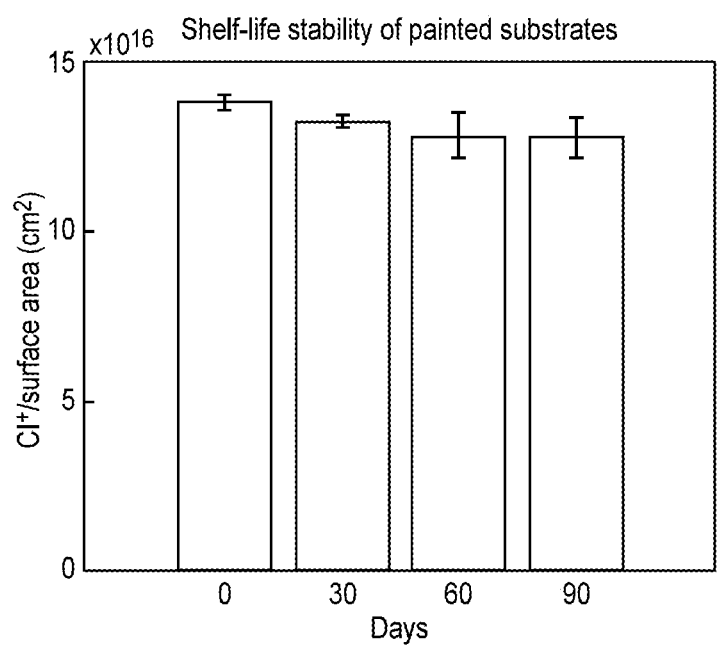
FIG. 11

BIOCIDAL POLYMER FOR LONG-TERM SURFACE PROTECTION

RELATED APPLICATIONS

This application claims the benefit of U.S. Provisional Patent Application No. 63/398,346, filed Aug. 16, 2022, and entitled "Biocidal Polymer for Long-Term Surface Protection", the entire contents of which are incorporated herein by reference.

GOVERNMENT SUPPORT CLAUSE

This invention was made with government support under OIA-1849206, OIA-1920954, and DGE-1633213 awarded by The National Science Foundation. The government has certain rights in the invention.

TECHNICAL FIELD

This disclosure relates to antimicrobial compositions having a rechargeable N-halamine moiety that is pre-activated with a halogen and, to methods of using the compositions on or throughout a treated surface for antimicrobial protection.

BACKGROUND OF THE INVENTION

Emergence of diseases, infections, outbreaks, and pandemics, caused by different types of pathogenic microorganisms such as viruses, bacteria, and fungi in the past few decades have caused immense financial loss and threatened life and well-being of people. Infections caused by pathogenic microorganisms are of great concern in healthcare, food processing industries, and the military, among others. Contaminations and infectious diseases kill more people worldwide than any other single cause. The contaminations and infectious diseases are triggered by pathogens, which are found everywhere—in the air, soil, and water. Mainly, the infections are produced by touching, eating, drinking, or breathing something that contains a pathogen.

Studies have shown that pathogens can become persistent and form biofilms. Biofilms formed by bacteria represent a system that allows bacteria to survive in hostile environments by forming permanent colonies and having the ability to form new colonies. Bacterial biofilms may be up to 1000 times more resistant to antimicrobial agents than free floating bacteria and are hotspots for horizontal gene transfer, allowing these bacteria to adapt to new environments. As a result, the American Medical Association has called for the removal of antibacterial agents in hygiene and cleaning products that have exhibited induction of antibiotic resistance. Similarly, European regulations have restricted the use of numerous active substances.

Further, according to the World Health Organization (WHO), hundreds of millions of patients suffer from nosocomial infections annually, causing significant mortality and financial losses for healthcare systems. Various pathogens have been documented on hospital equipment and other high touch surfaces and can be transmitted by patient and caregiver contact. In particular, the spread of diseases via medical devices, hospital surfaces, dental equipment, and general healthcare products is a major factor in disease pathogenesis and infection. According to the American Society for Health Care Engineering, painted and coated walls represent the most prolific surface within the hospital environment. Previous investigations have revealed that fungi and bacteria are also able to survive on polymeric materials such as latex paints for a long period of time. As a result, these surfaces are a vital source of infections that can have detrimental impacts on hospitalized patients.

Commonly used antimicrobial products and disinfectants are only able to provide very short-term relief from microorganisms. They usually suffer from at least one of the following important shortcomings among others: i) selective antimicrobial behavior; ii) corrosiveness; iii) leaching; iv) short-term efficacy; v) short shelf-life stability; vi) carcinogenicity; vii) high expense; and viii) non-rechargeable/reusable. Among various disinfectants, pathogens have not been able to develop resistance against chlorine-based products such as bleach. However, similar to many other disinfectants, they are not able to provide long-term protection. As a result, it is required to sanitize and disinfect surfaces regularly and several times per day to ensure a germ-free environment.

Currently, efforts are focused on preparation of biocides with long-term efficacy and high killing ability. Various antimicrobial agents containing metal and metal oxides such as silver and copper and their oxides, peptides, antibiotics, isothiazole, photoactivated antibacterial nanomaterials, guanidine, chitosan, and biguanides have been developed, tested, and coated onto or incorporated into variety of materials. Most recently, several types of polymers such as phosphonium materials, halogenated sulfonamides, and quaternary ammonium compounds (QAC) have been developed as polymeric biocides and tested against pathogens. However, many of these products are associated with various drawbacks. For example, QAC and polymeric phosphonium compounds leach into aqueous solutions, require prolonged contact time (hours or more) to inactivate pathogens, and are not rechargeable. In addition, polymeric phosphonium compounds are expensive to produce. Halogenated sulfonamides can be insoluble in water and are pH sensitive. Further, they can be regenerated but they can cause formation of toxic by-products.

Among widely available disinfectants, QAC formulations have been heavily used by various industries such as food-processing and healthcare. QACs tend to provide the longest protection against pathogens, however, little to know to information is available on the potential impact of QACs on the development of antibiotic resistance as these compounds selectively exert pressure on certain microorganisms. As a result, this can lead to fixation of novel genetic elements which can result in the spread of resistance genes and emergence of disinfectant-resistant microorganisms.

Therefore, there remains a need for novel antimicrobial agents for providing effective and long-term protection against harmful pathogens to minimize pathogen transmission.

SUMMARY OF THE INVENTION

Compositions, methods, and treated surfaces of the disclosure are provided for providing antimicrobial compositions containing rechargeable N-halamine moieties. Beneficially, the N-halamine moieties are pre-activated with a halogen source so that the composition may impart antimicrobial properties after a single application step without the need for a secondary application of a halogen source to activate the N-halamine moiety.

In Example 1, a composition comprises a copolymer comprising a rechargeable N-halamine moiety and one or more monomers comprising a sulfonic acid acrylic monomer, a diacrylate monomer, an acrylate monomer, a quaternary ammonium monomer, a vinyl acetate monomer, or a combination thereof, wherein the rechargeable N-halamine moiety is pre-activated with a halogen.

Example 2 relates to the composition according to Example 1, wherein the halogen is selected from the group consisting of Cl, Br, and I, and wherein the one or more monomers further comprises a monomer with adhesion functional groups, functional groups to increase water or ethanol solubility, or crosslinkers.

Example 3 relates to the composition according to Example 1, wherein the N-halamine moiety comprises N-chloro-2,2,6,6-tetramethyl-4-piperidyl methacrylate (Cl-TMPM), and wherein the one or more monomers comprises diallyldimethylammonium chloride (DADC), 2-acrylamido-2-methyl-1-propanesulfonic acid sodium salt (AMPS), dipentaerythritol penta-/hexa-acrylate (DPPA), triglycerol diacrylate (TGD), vinyl acetate (VA), or [3-(methacryloy-lamino)propyl]trimethylammonium chloride solution (M).

Example 4 relates to the composition according to Example 1, wherein the composition is an antimicrobial composition comprising an antibacterial, antiviral, antifungal, or biofilm-controlling composition.

Example 5 relates to the composition according to Example 4, wherein the composition is reusable as an antimicrobial composition by recharging the rechargeable N-halamine via exposure to a further halogen source resulting in re-activation of composition as the antimicrobial composition.

Example 6 relates to the composition according to Example 1, further comprising a coating material selected from the group consisting of a paint, a solution, a floor finishing solution, a molten compound, nanoparticles, or a combination thereof.

In Example 7, a method of using a composition comprises receiving a copolymer composition comprising a rechargeable N-halamine moiety and one or more monomers comprising a sulfonic acid acrylic monomer, a diacrylate monomer, an acrylate monomer, a quaternary ammonium monomer, a vinyl acetate monomer, or a combination thereof, wherein the rechargeable N-halamine moiety is pre-activated with a halogen, and applying the copolymer composition to a surface.

Example 8 relates to the method according to Example 7, wherein the copolymer composition is formed by combining the rechargeable N-halamine moiety and the one or more monomers via blending, mixing, or suspending.

Example 9 relates to the method according to Example 7, wherein the copolymer composition is sprayed onto the surface and provides long-term antimicrobial protection for a period of at least 30 days.

Example 10 relates to the method according to Example 7, wherein the surface is an inanimate surface.

Example 11 relates to the method according to Example 7, wherein a halogen charge level of the rechargeable N-halamine moiety can be detected through a color change using color-changing test methods.

Example 12 relates to the method according to Example 7, wherein the copolymer composition is incorporated as an additive to a coating material comprising a paint, a solution, a floor finishing, a molten compound, nanoparticles, or a combination thereof prior to applying to the surface.

Example 13 relates to the method according to Example 12, wherein the copolymer composition provides long-term antimicrobial protection for a period of at least 90 days.

Example 14 relates to the method according to Example 7, wherein the copolymer composition is applied in a single application step to impart antimicrobial properties without the need for exposure to an additional halogen source.

Example 15 relates to the method according to Example 7, further comprising a step of recharging the rechargeable N-halamine via exposure to a halogen source resulting in re-activation of the composition as an antimicrobial composition.

In Example 16, a treated surface comprises a body defining a treated surface comprising a copolymer composition, wherein the copolymer composition comprises a rechargeable N-halamine moiety and one or more monomers comprising a sulfonic acid acrylic monomer, a diacrylate monomer, acrylate monomer, an acrylate monomer, a quaternary ammonium monomer, a vinyl acetate monomer, or a combination thereof, and wherein the rechargeable N-halamine moiety is pre-activated with a halogen.

Example 17 relates to the treated surface according to Example 16, wherein the body comprises rubber, silicone, metal, plastic, wood, vinyl, or a combination thereof.

Example 18 relates to the treated surface according to Example 16, wherein the body is an inanimate object comprising furniture, medical equipment, a wall, a ceiling, or a combination thereof.

Example 19 relates to the treated surface according to Example 16, wherein the copolymer composition is adhered on the surface of the body or incorporated throughout the body to form the treated surface.

Example 20 relates to the treated surface according to Example 16, wherein the treated surface is re-activated as an antimicrobial composition by recharging the rechargeable N-halamine via exposure to a halogen source.

While multiple embodiments are disclosed, still other embodiments of the disclosure will become apparent to those skilled in the art from the following detailed description, which shows and describes illustrative embodiments of the disclosure. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF DRAWINGS

Various embodiments of the present disclosure will be described in detail with reference to the figures. Reference to various embodiments does not limit the scope of the disclosure. Figures represented herein are not limitations to the various embodiments according to the disclosure and are presented for exemplary illustration of the disclosure.

FIG. 10A is a photo showing the visual appearance of bare paint (top sample) versus mixed paint with PCTAD (bottom sample).

FIG. 10B is a photo showing the visual appearance of PCTAD mixed paint on wallpaper.

FIG. 10C is a photo showing the visual appearance of PCTAD mixed paint on plastic.

FIG. 11 is a graph showing the shelf-life stability of painted substrates after 0 days, 30 days, 60 days, and 90 days.

DETAILED DESCRIPTION

Figure 1:
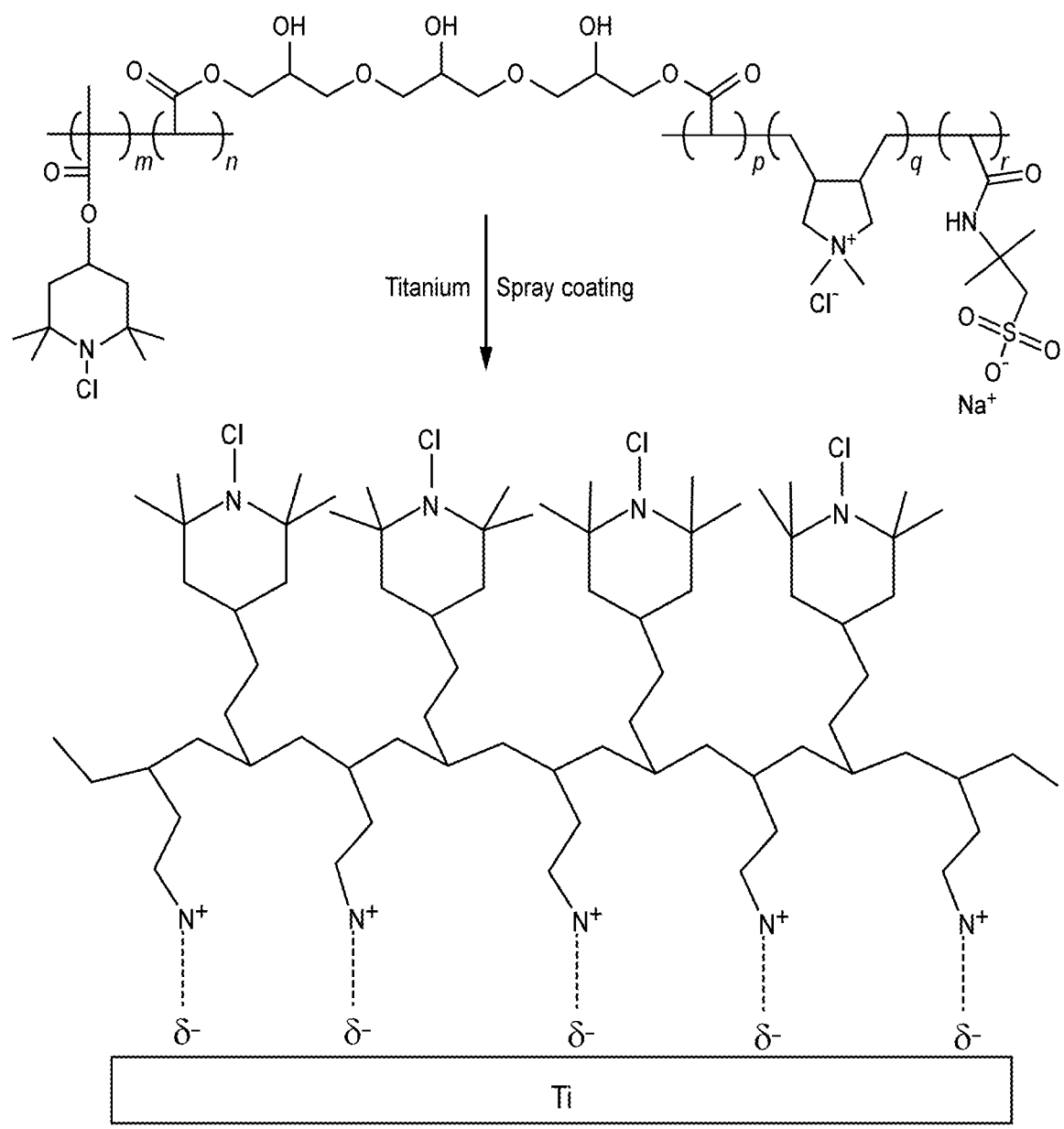
FIG. 1 is a scheme showing the linkage of poly(Cl-TMPM-TGD-AMPS-DADC) (PCTAD) to a metallic surface.

It is to be understood that all terminology used herein is for the purpose of describing particular embodiments only and is not intended to be limiting in any manner or scope. For example, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

The term "surfactant" refers to a molecule having surface activity, including wetting agents, dispersants, emulsifiers, detergents, and foaming agents, and the like. It is understood to be inclusive of the use of a single surfactant or multiple surfactants.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virions, viroids, viruses, phages, and some algae. As used herein, the term "microbe" is synonymous with microorganism.

As used herein, the term "disinfectant" refers to an agent that kills all vegetative cells including most recognized pathogenic microorganisms, using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2).

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "healthcare surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present disclosure. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present disclosure. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

The present disclosure is directed to compositions, methods, and treated surfaces that comprise a co-polymer composition comprising a rechargeable N-halamine moiety. The development of effective antimicrobial products is important for reducing the burden of microbial infections in the U.S. and globally, with the CDC listing several pathogens as urgent threats to public health, including, carbapenem-resistant Acinetobacter, drug-resistant *Candida auris*, and *Clostridioides difficile*. These microbes, in addition to others, such as *Staphylococcus aureus* and *Escherichia coli* are especially common in hospital care and nursing home settings, underscoring the urgent need to develop antimicrobial surfaces and materials in order to reduce their spread. Beneficially, the present disclosure provides for antimicrobial agents that are effective against a broad range of microorganisms, safe and non-toxic, long-lasting, and reusable or rechargeable.

In aspects, the compositions of the present disclosure comprise a copolymer composition. The copolymer composition may include a rechargeable N-halamine moiety, and one or more monomers. N-halamines are a type of compound which contain at least one nitrogen halogen covalent bond (N—X, wherein X: Cl, Br, or I). N-halamines provide an important advantage over commonly used disinfectants as they are rechargeable via exposure to a halogen source. While any halogen source may be used, examples may include, a composition comprising hypochlorite, such as, dilute household bleach. The halogen source can replenish the oxidative chlorine of the N-halamine. This treatment with a halogen source transforms the N—H bond to the subsequent N—X moiety. In some aspects, their corresponding polymers can provide fast and total kill against a wide range of microorganisms, without causing environmental concerns. Further, it is unlikely for microorganisms to establish resistance, making N-halamine moieties particularly useful as antimicrobial agents.

With respect to N-halamines, because of the halogen atoms covalently bonded to the nitrogen atoms, the free active halogen species (oxidative halogen: $Cl^+$, $Br^+$, or $I^+$) are slowly released into the environment. In some aspects, N-halamines are able to cause as much as a 9-log reduction of gram-negative and gram-positive bacteria within minutes of contact time. Compared to conventional biocides, N-halamines show superior properties such as durability, inability of pathogens to grow resistance against them, long-term stability in aqueous and dry conditions, efficiency, lack of toxicity, lack of leaching free halogen into the environment, cost-effectiveness, and non-corrosive.

N-halamines are tunable and their structure can be modified for different applications. In general, N-halamines with amine bonds have the strongest bond and are the most stable followed by amides and imides. However, in some aspects, biocidal activity may follow the reverse order. In examples, the weaker the N—X bond, the easier it would be for the oxidative halogen to leave the N-halamine structure to inactivate pathogens which could potentially result in an N-halamine with a shorter lifetime. As a result, biocidal activity of N-halamines can be tuned via using different functional groups in the N-halamine structure.

In embodiments, N-halamines can be prepared in either monomer or polymer form. Polymer and monomer N-halamines share similar properties and can both provide antimicrobial efficacy against pathogens. However, in some aspects, polymeric N-halamines are advantageous to the monomers due to their higher stability. N-halamine polymers can also be synthesized through reacting with other precursors which can produce a multifunctional antimicrobial agent.

Although other disinfectants containing free chlorine can inactivate pathogens, as described in the Background of the disclosure, they have disadvantages which can be problematic such as production of dangerous by-products, toxicity, and being corrosive. In addition, microorganisms will start to colonize the surface after 15 minutes of treatment, and many traditional disinfectants are short-lived with short durations of action.

N-halamines, on the other hand, can be a safer alternative to commonly used disinfectants and biocides. Further, increasing N-halamine concentrations in a final product can also overcome slow inactivation rates when compared to solutions with free halogen. Beneficially, N-halamines inactivate microorganisms via transferring their oxidative halogen directly to the cell membrane of a targeted pathogen upon encountering them. In some aspects, N-halamines may target amino or thiol functional groups in microorganisms' structures. N-halamines may inactivate pathogens via two different pathways: (i) contact pathway, which includes the direct transfer of an oxidative halogen from N-halamines to a cell receptor, and (ii) release pathway, which includes the dissociation of halogen from N-halamines to solution, with subsequent inactivation comprising the direct transfer of oxidative halogen to the pathogen cell wall.

Typically, N-halamines are not used or applied in pre-halogenated form. With the conventional use of N-halamines, a coating procedure would normally consist of two steps: 1) using an N-halamine coating; and 2) a subsequent halogen treatment. The subsequent halogen treatment activates the N-halamine with a halogen source such as bleach to become antimicrobial. However, the two-step process limits their applications and makes N-halamines time-consuming to use. Further, halogenated N-halamines in aqueous/ethanolic solutions provide poor solubility and stability, which further limits their use.

As provided herein, the composition of the present disclosure provides a rechargeable N-halamine that is pre-activated with a halogen. In some aspects, the synthesized N-halamine moiety is pre-halogenated and ready-to-use, therefore not requiring a two-step process. In embodiments, any halogen source may be used. In further embodiments, the halogen may include, but is not limited to, chlorine, bromine, and iodine. In some aspects, the halogen is chlorine.

The present disclosure provides a rechargeable, pre-halogenated N-halamine moiety. The N-halamine moiety comprises one or more nitrogen atoms covalently bonded to a halogen. In some aspects, the N-halamine moiety may include compounds such as, but not limited to, N-chloro-2,2,6,6-tetramethyl-4-piperidyl methacrylate (Cl-TMPM), 1,3-dihalo-5,5-dimethylhydantoin, trichloro- or dichloroisocyanurates, N-halogenated poly(styrenehydantoins), hydantoin-containing N-halamines, imidazolidinone-containing N-halamines, oxazolidinone-containing N-halamines, succinimide-containing N-halamines, 4-Piperidinol-containing N-halamines, 1,3,8-triazaspiro[4.5]-decane-2,4-dione-containing N-halamines, 1,3,5-Triazinane-2,4-dione-containing N-halamines, barbituric acid-containing N-halamines, cyanuric acid-containing N-halamines, inorganic N-halamines, amine N-halamines, amide N-halamines, amino acid- and peptide-containing N-halamines, aromatic compound-containing N-halamines, melamine-containing N-halamines, polysaccharide-containing N-halamines, hydantoin acrylamide-based N-halamines, or a combination thereof. In some embodiments, the N-halamine moiety comprises Cl-TMPM.

In embodiments, the pre-halogenated (or may be further referred to as "pre-activated") and ready-to-use compositions comprise a co-polymer. In aspects, composition comprises the rechargeable N-halamine moiety and one or more monomers. The co-polymer may include a number of different monomers. These monomers introduce different properties to the co-polymer composition, such as, for example, hydrophilicity, rigidity, stability, and antimicrobial activity.

The one or more monomers as provided herein may comprise a charged monomer, a neutral monomer, a cross-linker monomer, or a combination thereof. In some embodiments, the one or more monomers may include a sulfonic acid acrylic monomer, a diacrylate monomer, an acrylate monomer, a quaternary ammonium monomer, a vinyl acetate monomer, or a combination thereof. In aspects, the one or more monomers may comprise a monomer with adhesion functional groups, functional groups to increase water or ethanol solubility, or crosslinkers.

In some embodiments, the charged monomers may include, but are not limited to, quaternary ammonium monomers and sulfonic acid acrylic monomers. The quaternary ammonium monomers may include, for example, diallyldimethylammonium chloride (DADC) or [3-(methacryloylamino)propyl]trimethylammonium chloride solution (M), and the sulfonic acid acrylic monomer may include, for example, 2-acrylamido-2-methyl-1-propanesulfonic acid sodium salt (AMPS). In some embodiments, the neutral monomers may include vinyl acetate (VA).

Charged monomers, such as quaternary ammonium monomers, are able to attract bacteria and facilitate the inactivation of microorganisms. Additionally, both the charged and neutral compounds can enhance the adhesive capability of the monomers to a broad range of surfaces under normal conditions, although the charged compounds may provide stronger adherence to surfaces than neutral compounds. In some aspects, TMPM or Cl-TMPM monomers are not soluble in water, and therefore, the presence of hydrophilic monomers is essential in the structure of the final copolymer composition in order to provide a water-soluble copolymer composition. As a result, various monomers can be used to polymerize with Cl-TMPM within the disclosed compositions. In further aspects, the charged monomers may further facilitate bacterial inactivation. The monomers including the positively charged monomers, such as DADC and M, and the negatively charged monomers, such as AMPS, and neutral monomers, such as the VA, may be incorporated into the copolymer composition as industrially available monomers that are safe, non-toxic, and stable.

Additionally, the inclusion of both anionic and/or cationic monomers in a polymeric structure can enhance adhesion to a broad range of surfaces and improve antimicrobial activity as well as improve solubility in water. For example, quaternary ammonium salts, which possess a positive charge, can be polymerized with N-halamines. This will enhance the water solubility of N-halamines with poor water solubility. In some aspects, the final composition can attract negatively charged bacteria, which can be inactivated through encountering the N-halamine moiety. This process can potentially accelerate inactivation of the target microorganism. Moreover, quaternary ammonium salts are mild antibacterial agents and increase hydrophilicity which can also help with the inactivation of pathogens in aqueous conditions.

In further embodiments, the presence of a multi-functional crosslinker may enhance the physical and chemical properties of polymers compared to non-crosslinked polymers. It is important that the final composition has high shelf-life stability in both solid and solution form and is able to retain its chlorine load under normal and harsher environmental conditions. In some aspects, the crosslinker monomer aids in linking the N-halamine moiety and one or more monomers together. In embodiments, the crosslinking monomers may include, a diacrylate monomer, an acrylate monomer, or a methacrylate monomer. In further embodiments, the crosslinking monomers may include, but are not limited to, dipentaerythritol penta-/hexa-acrylate (DPPA) and triglycerol diacrylate (TGD). The crosslinking monomers may be further included in the composition to increase chlorine stability. Similar to the aforementioned monomers, these crosslinkers are safe and non-toxic and may be further used for biomedical applications.

In some aspects, the one or more monomers may include a charged monomer and no crosslinking monomer. In other embodiments, the one or more monomers may include a crosslinking monomer and no charged monomer. In further embodiments, the one or more monomers may include both a crosslinking monomer and a charged monomer, including embodiments wherein two or more charged monomers or crosslinking monomers are included. In some embodiments, the mole ratio of charged monomers to crosslinking monomers may be in the range of between about 1:20 to about 20:1, between about 1:15 to about 15:1, or between about 1:10 to about 10:1.

In other aspects, the one or more monomers may include a neutral monomer and crosslinking monomer. In embodiments, the mole ratio of neutral monomer to crosslinking monomer may be in the range of between about 1:5 to about 5:1, or between about 1:2 to about 2:1. In further aspects, the one or more monomers may include a neutral monomer, at least one charged monomer, and at least one crosslinking monomer. In embodiments, the mole ratio of neutral monomer to charged monomer to crosslinking monomer may be in the range of between about 1:15:5 to 1:10:3.

While different combinations of monomers may be contemplated by those skilled in the art, an example of a copolymer composition may include, but is not limited to, a combination of Cl-TMPM, TGD, AMPS, and DADC (PCTAD). The DADC and AMPS in the PCTAD structure enhances its adherence to charge bearing surfaces (for example, metals), increase its solubility in water/ethanol solvents, and increase its chemical and physical stability. In some aspects, metal surfaces bear residual charges when exposed to solvents such as water or ethanol. While surface charge will depend on the pH of the solution, titanium (Ti) or stainless steel (SS) surfaces carry a large amount of negative charge at neutral pH (~7) or above. Therefore, PCTAD can partially adhere to these surfaces through linkage of its positively charged nitrogen to a charged surface. In an example, FIG. 1 shows how PCTAD can partially adhere to a negatively charged Ti surface.

In some aspects, PCTAD was found to be highly soluble and stable in ethanol and water. Further, PCTAD, which is solid polymer at room temperature, provides long-term shelf-life stability. In some aspects, the compositions comprising the rechargeable N-halamine moiety and copolymer composition may experience less than a 20% reduction of its original chlorine after 90 days of storage. In further aspects, the compositions undergo less than a 10% reduction of its original chlorine after 90 days. In some embodiments, the compositions may undergo less than a 5% reduction of its original chlorine after 90 days.

In embodiments, the disclosed compositions comprising the rechargeable N-halamine moiety and the one or more monomers may be provided directly to a source in solid form. The solid form may include a dry powder. In other embodiments, the copolymer composition is diluted in a solvent prior to use. Solvents such as, but not limited to, water, acetone, ethanol, methanol, 2-propanol, ethyl acetate, isopropyl acetate, methyl ethyl ketone, 1-butanol, and tert-butanol may be used. These solvents are environmentally friendly and have low toxicity. In some aspects, the solvent is water or ethanol. In further aspects, the solvent is ethanol in a 50% or 70% active concentration in water.

The compositions of the disclosure may optionally include one or more functional agents. The one or more functional agents may include surfactants, adhesion molecules, siloxanes, silican-based adhesive aids, hydroxyl-based adhesive aids, epoxides, solubility aids, additional antimicrobial agents, or a combination thereof.

As provided throughout the disclosure, N-halamine compounds for antimicrobial purposes generally require to be treated with a source of free chlorine, such as bleach, to be activated. This requirement makes them unsuitable and undesirable for many applications including long-term protection of surfaces against pathogens, electronics, household appliances, and polished metals. Moreover, this makes the application of N-halamine products time-consuming and less effective in situations where time is of the essence, such hospitals. However, contrary to conventional N-halamine compounds, the N-halamine monomers of the disclosure are pre-halogenated and do not require an activation step in order to address the aforementioned issues.

The compositions containing pre-halogenated N-halamine may be used for a variety of different applications, such as, but not limited to, antimicrobial compositions, water treatment, surface disinfection, antimicrobial ointments, wound dressing products, and general decontamination/protection systems. In preferred embodiments, the composition is an antimicrobial composition comprising an antibacterial, antiviral, antifungal, or biofilm-controlling composition. In aspects, the composition is reusable as an antimicrobial composition by recharging the rechargeable N-halamine via exposure to a further halogen source resulting in the re-activation of the composition as an antimicrobial composition.

In some embodiments, the composition comprising the pre-halogenated, rechargeable N-halamine, and one or more monomers may be used directly on its own. The composition may be used as a spray, as a solution, or as a powder for application to a surface as a coating. When applied to a surface, the composition acts as a surface disinfectant and protector against pathogens. Surface coatings were found to be stable under normal storge conditions and durable against moisture, wet and dry touch, heat, and UV irradiation. As a result, these coatings are suitable for variety of applications. Most importantly, this spray is a ready-to-use N-halamine product which does not require a secondary treatment after application in order to initiate antimicrobial properties.

In other embodiments, the copolymer composition may be further incorporated into a coating material, such as, but not limited to, a paint, a solution, a floor finishing solution, a molten compound, nanoparticles, or a combination thereof. In some embodiments, the composition is a paint composition incorporating the copolymer composition as described herein into a pre-existing paint formula. In other embodiments, the composition is a floor finishing composition incorporating the copolymer composition as described herein into a pre-existing floor finishing formula.

In some embodiments, the compositions of the disclosure can be added to latex paint to prepare antimicrobial paints for protection of walls and painted substrates against pathogens, including against gram-positive bacteria, gram-negative bacteria, and viruses. These products are advantageous because they can be added directly to a wide range of standard paints without altering base properties, thus providing a rechargeable anti-microbial paint product. Similar to the spray coated surfaces, painted surfaces do not require any post-treatment after application. The painted surfaces are durable against harsher conditions such as heat, UV irradiation, and exposure to chemicals that are known to neutralize chlorine.

Further provided herein are methods of using a composition. The methods may comprise receiving a copolymer composition comprising the rechargeable N-halamine moiety and one or more monomers. In some embodiments, the one or more monomers comprise a sulfonic acid acrylic monomer, a diacrylate monomer, an acrylate monomer, a quaternary ammonium monomer, a vinyl acetate monomer, or a combination thereof. In some aspects, the rechargeable N-halamine moiety is pre-activated with a halogen as described throughout the disclosure. The pre-activated N-halamine moiety allows for the compositions to be applied in a single application step to impart antimicrobial properties without the need for exposure to an additional halogen source or subsequent activation step with a halogen source.

In some embodiments, the copolymer composition is formed by combining the rechargeable N-halamine moiety and the one or more monomers via blending, mixing, or suspending. In embodiments, the copolymer composition is further applied to a surface. In some aspects, the surface is an inanimate surface. In embodiments, the surface may comprise rubber, silicone, metal, plastic, wood, vinyl, polymers, or a combination thereof. In further embodiments, the surface may comprise furniture, medical equipment, a wall, a ceiling, a textured surface, a food processing surface, a healthcare surface, other hard surface, or a combination thereof.

The treated surfaces as provided herein, whether applied directly as a spray or incorporated into a coating for further application to a surface, can be recharged after the halogen content has been exhausted. It has been observed by other researchers that N-halamine-containing materials or coatings lose their over time. As an example, Kocer et al. observed that N-halamines lost more than 50% of their original chlorine content over an 8-week period under ambient lighting in air. Loss of oxidative chlorine over time is usually be caused by environmental factors such as UV light, ambient lighting, temperature, and moisture or humidity. In some examples, after exposure to harsher conditions such as UV or heat, the halogen loading of the treated surfaces or coatings can be decreased. In these cases, the treated surfaces can be easily recharged by exposing the coating comprising the N-halamine to a halogen source, resulting in the re-activation of the composition to an antimicrobial composition. In embodiments, the halogen source is a source of free chlorine, such as bleach sprays, wipes, or dilute household bleach. Other sources of halogen may be further utilized for recharging the compositions. Conveniently, the halogen charge level of the rechargeable N-halamine moiety can be detected through a color change using color-changing test methods. While a variety of color-changing test methods may be considered, some examples include, but are not limited to, iodine staining tests or color-changing test strip methods.

In embodiments wherein the composition is sprayed onto a surface, the composition provides long-term antimicrobial protection for a period of at least 30 days, at least 40 days, or at least 60 days. In further embodiments, the composition is incorporated as an additive to a coating material and provides long-term antimicrobial protection for a period of at least 60 days or at least 90 days.

The compositions provided herein may be further applied on or throughout a body defining a treated surface. In embodiments, a treated surface is provided comprising a body defining the treated surface comprising the copolymer composition. The body may comprise, but is not limited to, rubber, silicone, metal, plastic, wood, vinyl, or a combination thereof. In aspects, the body may be an inanimate object comprising furniture, medical equipment, a wall, a ceiling, or a combination thereof. The composition may be adhered on the surface of the body or incorporated throughout the body to form the treated surface. For example, where the composition is incorporated throughout an inanimate object, the pre-halogenated antimicrobial properties of the composition are built directly into the object defined by a treated surface. In aspects, the treated surface can be re-activated as an antimicrobial composition by recharging the rechargeable N-halamine via exposure to a halogen source. The treated surfaces may be found in various areas and industries including, but not limited to, water disinfection and purification, medical and dental devices and instruments, hospitals, textiles, food packaging, and healthcare products, healthcare surfaces.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

As provided throughput the Examples, analytical titration of the chlorine measurement data was expressed as mean±standard deviation where applicable. The data were analyzed using the analysis of variance (ANOVA), and the differences were considered statistically significant if $P<0.05$. Antibacterial efficacy was reported as log reduction of bacterial colonies, and a total of $n=4$ was used for each test condition for analytical titration of chlorine measurement and antibacterial efficacy tests.

Example 1

Synthesis and Characterization of the Pre-Chlorinated N-Halamine Polymer

Materials: 2,2,6,6-tetramethyl-4-piperidyl methacrylate (TMPM) was ordered from TCI America (Portland, OR). All other materials, chemicals, and supplies were purchased from Sigma-Aldrich (St. Louis, MO).

Chlorine Load Measurement: Chlorine load of polymeric powders was measured by following an iodometric/thiosulfate titration method. In general, known weights of samples were added to a flask containing a solution of approximately 1 g potassium iodide, 10 ml DI water, 90 ml ethanol, and 1 ml of glacial acetic acid. Flasks were sealed and the mixture was shaken for 30 minutes at room temperature. Released iodine was titrated with a sodium thiosulfate aqueous solution with accurate known normality. Blank titrations on water samples were performed under the same conditions as control samples. The concentration of chlorine load per sample weight and number of chlorine atoms per surface area were calculated according to the following equations:

$$Cl^+ \% = \frac{N \times (V_{Cl} - V_0) \times 35.45}{w \times 2} \times 100 \quad (1)$$

$$Cl^+ (\text{atoms/cm}^2) = \frac{N \times (V_{Cl} - V_0)}{S \times 2} \times 6.022 \times 10^{23} \quad (2)$$

where N is normality of sodium thiosulfate solution, $V_{Cl}$ is the volume of sodium thiosulfate used for titration of final sample, $V_0$ is the volume of thiosulfate solution used for blank solution as the control, w is the sample weight, and S is the sample's surface area in cm².

Synthesis of N-chloro-2,2,6,6-tetramethyl-4-piperidyl methacrylate (Cl-TMPM): Cl-TMPM was prepared following the work carried out by Cao et al., which is herein incorporated by reference in its entirety, with some modifications as shown in Scheme 1. A solution of sodium dichloroisocyanurate (DCCNa) (0.275 mol/60.5 g in 350 ml water) was mixed with a solution of TMPM (0.25 mole/56.5 g in 150 ml chloroform). TMPM was selected as the limiting agent to ensure complete transformation to Cl-TMPM. The mixture was vigorously stirred for 2 hours. Mixture was then poured into a separatory funnel and chloroform layer was separated and then filtered. This solution was dried with anhydrous magnesium sulfate for 24 hours. Finally, magnesium sulfate was filtered off and chloroform was evaporated under vacuum. Cl-TMPM was obtained as a clear transparent liquid at room temperature (yield=100%).

Scheme 1 - Synthesis of Cl-TMPM

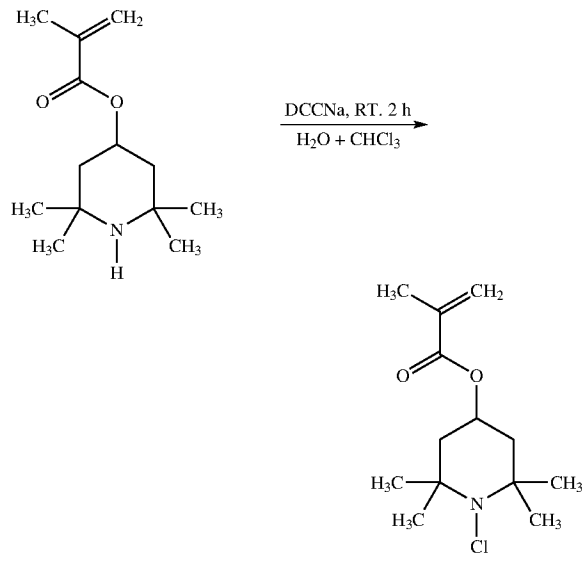

The Fourier transform infrared (FTIR) data recorded with 32 scans using a Nicolet 6700 FTIR spectrometer with an attenuated total reflectance (ATR) accessory. ¹H NMR spectra were recorded with 16 scans using a Bruker 400 MHz spectrometer instrument. Polymer composition was determined by discussing ¹H NMR spectra of PCTAD and starting monomers.

Development of a pre-chlorinated and water-soluble N-halamine polymer as antimicrobial agent: Cl-TMPM was polymerized with various monomers in order to achieve a water/ethanol-soluble and pre-chlorinated polymer. The additional Examples provided within the present disclosure provide exemplary polymerization reactions that have been conducted. Methanol was used as the solvent and 2,2'-Azobis(2-methylpropionitrile) (AIBN) was used as the initiator in all of the following polymerization reaction examples. Polymers that were soluble in water, ethanol, or a mixture thereof were chosen for measurement of their chlorine load and to undergo shelf-life stability testing. Selected polymer powders were stored in transparent 50 ml test tubes at room temperature and ambient lighting (T=~25° C., relative humidity (RH)=50-60%). In order to determine the shelf-life stability of the selected polymer, chlorine load of the sample was measured at day 0 and day 14 following the iodometric/thiosulfate titration method. If the polymer was able to retain at least 95% of its chlorine, it would undergo further testing, such as extended shelf-life stability, stability in solution, and characterization using NMR and FT-IR instruments.

Polymerization Reactions

Polymer 1: Monomers of Cl-TMPM and diallyldimethylammonium chloride (DADC).

Procedure: In order to enhance attachment to surfaces, a positively charged polymer was synthesized by using Cl-TMPM as the N-halamine moiety and DADC as the positive-charge bearing monomer. 0.03 mol Cl-TMPM and 0.03 mol DADC, each separately dissolved in 50 ml methanol. Prepared solutions were mixed together in a 2-neck round bottom flask (mole ratios of Cl-TMPM:DADC 1:1). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and the temperature was set to 65° C. The reaction mixture was then stirred for 5 hours under nitrogen protection.

Polymer 2: Monomers of Cl-TMPM, DADC, and 2-Acrylamido-2-methyl-1-propanesulfonic acid sodium salt (AMPS).

Procedure: A crosslinker was not included in the synthesis of polymer 2. As a result, Cl-TMPM, DADC, and AMPS were selected as the monomers. 0.05 mole Cl-TMPM, 0.05 mole DADC, and 0.012 mole AMPS were each separately dissolved in 50 ml methanol. Prepared solutions were mixed together in a 2-neck round bottom flask (mole ratios of Cl-TMPM:DADC:AMPS 4.17:4.17:1). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 3: Monomers of Cl-TMPM, DADC, and AMPS.

Procedure: 0.05 mole Cl-TMPM, 0.05 mole DADC, and 0.06 mole AMPS were each separately dissolved in 50 ml methanol. Prepared solutions were mixed together in a 2-neck round bottom flask (mole ratios of Cl-TMPM: DADC:AMPS 1:1:1.2). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 4: Monomers of Cl-TMPM, DADC, and dipentaerythritol penta-/hexa-acrylate (DPPA).

Procedure: DPPA is a crosslinker monomer and was included in the polymer composition since crosslinkers are known to create a rigid and stable polymeric backbone. 0.03 mole Cl-TMPM, 0.03 mole DADC, and 0.03 mole DPPA were each separately dissolved in 50 ml methanol. Prepared solutions were mixed together in a 2-neck round bottom flask (mole ratios of DPPA:Cl-TMPM:DADC 1:1:1). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 5: Cl-TMPM, DPPA, DADC, and AMPS.

Procedure: 0.02 mole DPPA, and 0.02 mole Cl-TMPM, 0.02 mole DADC, and 0.02 mole AMPS were each separately dissolved in 75 ml methanol. Prepared solutions were mixed together in a 2-neck round bottom flask. 500 mg AIBN was separately dissolved in 50 ml methanol and was added to the flask (mole ratios of DPPA:Cl-TMPM:DADC: AMPS 1:1:1:1). Nitrogen was bubbled for 30 minutes in the reaction mixture to remove dissolved oxygen and prevent oxidation of monomers and synthesized polymer. Thereafter, reaction flask was put in an oil bath and temperature was set to 65° C. Reaction mixture was then stirred for 2 hours under nitrogen protection.

Polymer 6: Cl-TMPM, DPPA, DADC, and AMPS.

Procedure: 0.005 mole DPPA, 0.005 mole Cl-TMPM, 0.02 mole DADC, and 0.02 mole AMPS were each separately dissolved in 50 ml methanol. Prepared solutions were mixed together in a 2-neck round bottom flask (mole ratios of DPPA:Cl-TMPM:DADC:AMPS 1:1:4:4). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 7: Cl-TMPM, DPPA, DADC, and AMPS.

Procedure: 0.0033 mole DPPA, 0.0198 mole Cl-TMPM, 0.0198 mole DADC, and 0.0198 mole AMPS were each separately dissolved in 75 ml methanol. Prepared solutions were mixed together in a 2-neck round bottom flask (mole ratios of DPPA:Cl-TMPM:DADC:AMPS 1:6:6:6). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 8: Cl-TMPM, DPPA, DADC, and AMPS.

Procedure: 0.01 mole DPPA, 0.06 mole Cl-TMPM, 0.07 mole DADC, and 0.06 mole AMPS were each separately dissolved in 75 ml methanol. Prepared solutions were mixed together in a 2-neck round bottom flask (mole ratios of DPPA:Cl-TMPM:DADC:AMPS 1:6:7:6). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 9: Cl-TMPM, DPPA, DADC, and AMPS.

Procedure: 0.001 mole DPPA, 0.019 mole Cl-TMPM, 0.04 mole DADC, and 0.04 mole AMPS were each separately dissolved in 50 ml methanol. Prepared solutions were mixed together in a 2-neck round bottom flask (mole ratios of DPPA:Cl-TMPM:DADC:AMPS 1:19:40:40). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 10: Cl-TMPM, triglycerol diacrylate (TGD), vinyl acetate (VA).

Procedure: 0.004 mole Cl-TMPM, 0.002 mole TGD, and 0.001 mole VA were each separately dissolved in 50 ml methanol. Prepared solutions were mixed together in a 2-neck round bottom flask (mole ratios of TGD:Cl-TMPM: VA 2:4:1). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 11: Cl-TMPM, TGD, [3-(methacryloylamino) propyl]trimethylammonium chloride solution (M), and VA.

Procedure: 0.01 mole Cl-TMPM, 0.001 mole TGD, 0.01 mole M, and 0.0025 mol VA were each separately dissolved in 50 ml methanol. Prepared solutions were mixed together in a 2-neck round bottom flask (mole ratios of TGD:Cl-TMPM:VA:M 1:10:2.5:10). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 12: Cl-TMPM, TGD, M, and VA.

Procedure: 0.01 mole Cl-TMPM, 0.0025 mole TGD, 0.0075 mole M, and 0.001 mol VA were each separately dissolved in 50 ml methanol. Prepared solutions were mixed together in a 2-neck round bottom flask (mole ratios of TGD:Cl-TMPM:VA:M 2.5:10:1:7.5). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 13: Cl-TMPM, TGD, and M.

Procedure: 0.02 mole Cl-TMPM, 0.002 mole TGD, and 0.025 mole M were each separately dissolved in 50 ml methanol. Prepared solutions were mixed together in a 2-neck round bottom flask (mole ratios of TGD:Cl-TMPM:M 1:10:12.5). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 14: Cl-TMPM, TGD, and M.

Procedure: Based on the previous results, presence of a crosslinker monomer is essential to synthesize a polymer that can be collected in solid form. However, DPPA and TAIC as crosslinkers made the final product insoluble in water or ethanol. As a result, TGD, a water-soluble crosslinker monomer was chosen to be investigated. 0.004 mole Cl-TMPM, 0.001 mole TGD, and 0.004 mole M were each separately dissolved in 50 ml methanol. Prepared solutions were mixed together in a 2-neck round bottom flask (mole ratios of TGD:Cl-TMPM:M 1:4:4). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 15: Cl-TMPM, TGD, M, and AMPS.

Procedure: 0.004 mole Cl-TMPM, 0.001 mole TGD, 0.002 mole M, and 0.002 mol AMPS were each separately dissolved in 50 ml methanol. Prepared solutions were mixed together in a 2-neck round bottom flask (mole ratios of TGD:Cl-TMPM:AMPS:M 1:4:2:2). 500 mg AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Polymer 16: Cl-TMPM, DADC, AMPS, and TGD.

Procedure: 0.049 mol Cl-TMPM, 0.0005 mole DADC, 0.0005 mole AMPS, and 0.0092 mole TGD each separately dissolved in 50 ml methanol. Prepared solutions were mixed together in a 2-neck round bottom flask (mole ratios of TGD:Cl-TMPM:DADC:AMPS 18.4:98:1:1). 1 g AIBN was separately dissolved in 50 ml methanol and was added to the flask. Nitrogen was bubbled for 30 minutes in the reaction mixture to remove dissolved oxygen and prevent oxidation of monomers and synthesized polymer. Thereafter, the reaction flask was put in an oil bath and temperature was set to 65° C. The reaction mixture was then stirred for 5 hours under nitrogen protection.

Figure 2A:
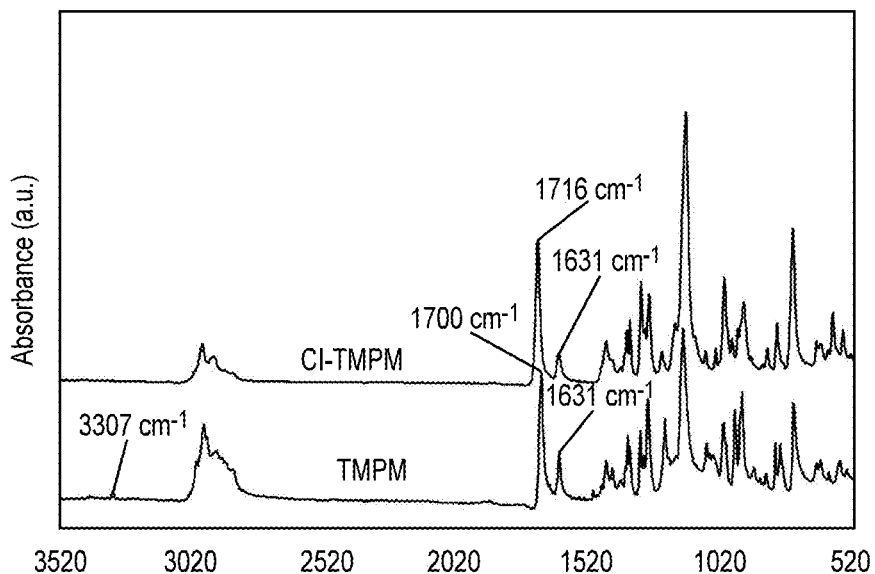
FIG. 2A shows a stacked FT-IR spectra of Cl-TMPM and TMPM.
Figure 2B:
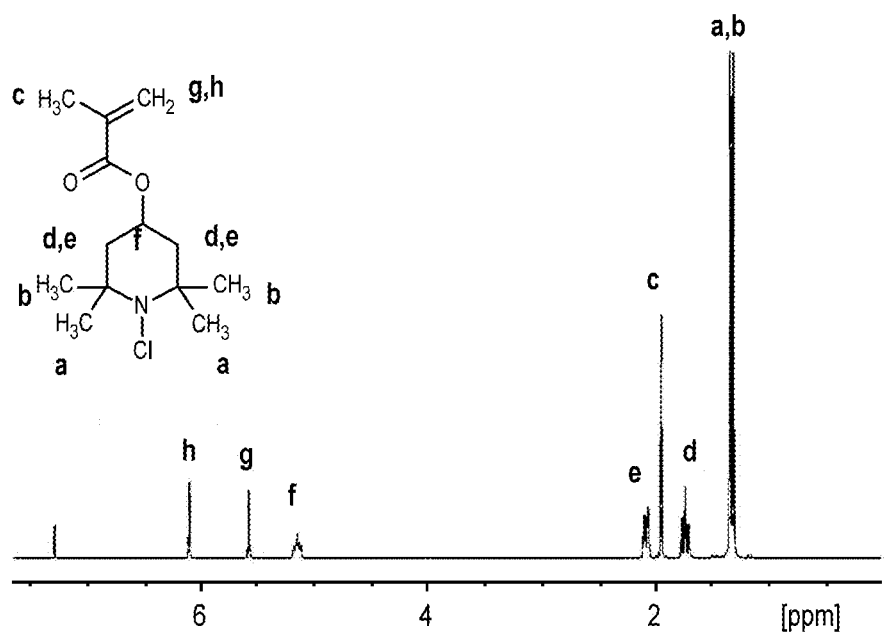
FIG. 2B shows the $^1$H NMR spectrum of Cl-TMPM with solvent CDCl$_3$.

Characterization of Cl-TMPM: Transformation of TMPM to Cl-TMPM structure was confirmed by FTIR (FIG. 2A). In FIG. 2A, a small peak at 3307 cm$^{-1}$ could be seen in TMPM spectra, while there was no peak observed at 3307 cm$^{-1}$ in the Cl-TMPM spectra. This peak was attributed to the N—H vibrations in the structure of TMPM. After chlorination, the hydrogen attached to this nitrogen was replaced by chlorine and thus the N—H vibration peak disappeared. It can also be seen that the ester carbonyl peak shifted slightly to the left (from 1700 cm$^{-1}$ to 1716 cm$^{-1}$) in the Cl-TMPM structure which can be caused by replacement of the hydrogen atom with chlorine. In both structures, the peak located at around 1631 cm$^{-1}$ represents the carbon-carbon double bond stretching. The structure of Cl-TMPM was further confirmed by $^1$H NMR (FIG. 2B). It should be noted that Cl-TMPM appeared to be a pale yellow, oily, and transparent liquid which did not dissolve in water and formed a separate layer on the bottom when mixed with water.

Example 2

Solubility of Synthesized Polymers in Water and Ethanol

One of the overall goals in this example was to synthesize an N-halamine compound that was soluble in water and/or ethanol. As a result, upon synthesis of each polymer provided in Example 1, their solubility was tested. If the polymers were soluble in those solvents, they were selected to undergo shelf-life stability testing, which is further provided in Example 3.

Four polymers were found to be soluble in both water and ethanol. Polymer 3, Polymer 14, Polymer 15, and polymer 16, herein denoted as PCDA, PCTM, PCTAM, and PCTAD, respectively. All of these polymers were found to dissolve with a concentration of greater than 10 mg/ml in water and 50% ethanol in water solution. A summary of the solubility results of these polymers can be observed in Table 1.

TABLE 1

| Polymer | Solubility in water (mg/ml) | Solubility in 50% ethanol in water (mg/ml) |
|---------|---|---|
| PCDA | 10 | 20 |
| PCTM | 12 | 54 |
| PCTAM | 20 | 73 |
| PCTAD | 30 | 400 |

While the polymers from Example 1, other than those mentioned in Table 1, did not provide suitable solubility in water or ethanol, they may potentially be used for other antimicrobial applications such as water or waste-water treatment/disinfection, membrane filtration, or other reusable antimicrobial agents which might require the antimicrobial agent to stay stable and be insoluble in aqueous solutions.

Example 3

Shelf-Life Stability of Polymers

Each of PCDA, PCTM, PCTAM, and PCTAD from Example 2 were further evaluated for shelf-stability as provided below.

PCDA: It was found that this polymer was not able to retain at least 95% of its chlorine load after 14 days of storage. Chlorine load of the polymer decreased from 0.8 wt % to 0.25 wt % which is a significant reduction. Based on this finding, this polymer was not further investigated. The lack of shelf-life stability could be related to the absence of a cross-linker in the polymeric backbone.

PCTM: PCTM is a positively charged polymer. This positive charge can enhance adherence to certain substrates and can improve antimicrobial activity by attracting negatively charged cell membranes of bacteria. This polymer showed improved shelf-life stability compared with PCDA. However, it lost more than five percent of its chlorine load after fourteen days of storage and was found to be highly hygroscopic.

PCTAM: After the unsuccessful application of PCTM, PCTAM polymer was synthesized with an anionic monomer in addition to a cationic monomer. Similar to PCTM, this polymer showed high shelf-life stability, however, it was highly hygroscopic and was not able to retain at least 95% of its original chlorine load after fourteen days of storage.

Figure 3:
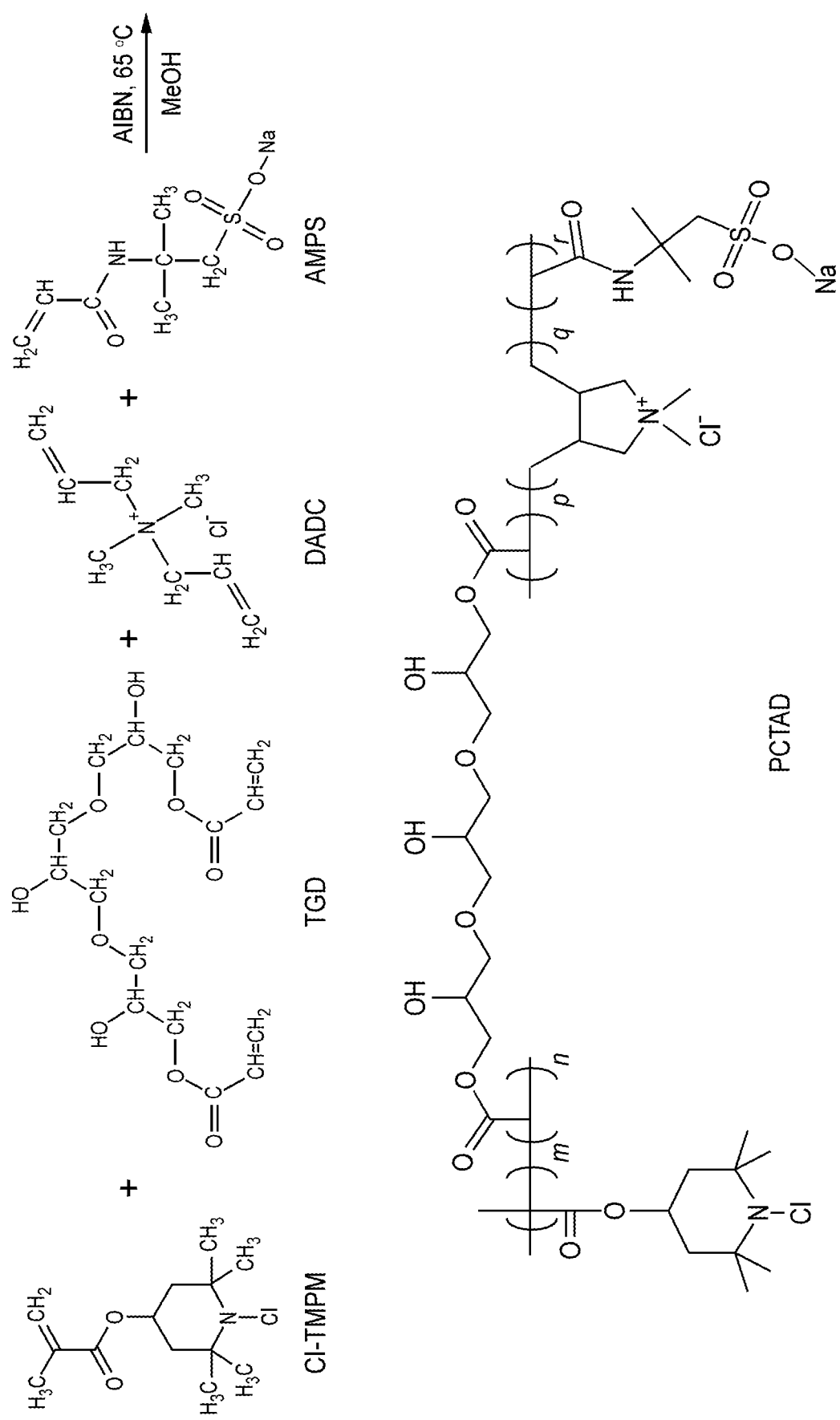
FIG. 3 is a schematic synthesis of PCTAD.

PCTAD: Based on previous results, it was concluded that the presence of water-soluble monomer(s) was necessary in order to synthesize a water/ethanol soluble polymeric N-halamine containing Cl-TMPM. Additionally, the presence of a hydrophilic crosslinker, such as TGD, for example, was crucial to having a stable and water-soluble pre-chlorinated N-halamine polymer. On the other hand, it was found that including high mol percentages of charged monomers resulted in the final product being highly hygroscopic which resulted in rapid loss of chlorine or unpleasant-looking coated surfaces. Taking into consideration all of the above observations, PCTAD was synthesized. The schematic synthesis of PCTAD can be observed in FIG. 3. This polymer was found to be highly soluble in water and ethanol with more than 40 mg/ml and 400 mg/ml solubility limits, respectively. As a result, PCTAD was selected for further investigation and additional studies further described herein. The appearance of PCTAD was an off-white powder.

A summary of the storage stability data of PCDA, PCTM, PCTAM, and PCTAD polymers can be found in Table 2.

TABLE 2

| Polymer | Chlorine loss after 14 days of storage (%) |
|---|---|
| PCDA | 69 |
| PCTM | 20 |
| PCTAM | 17 |
| PCTAD | <1 |

Example 4

Characterization of PCTAD

Figure 4A:
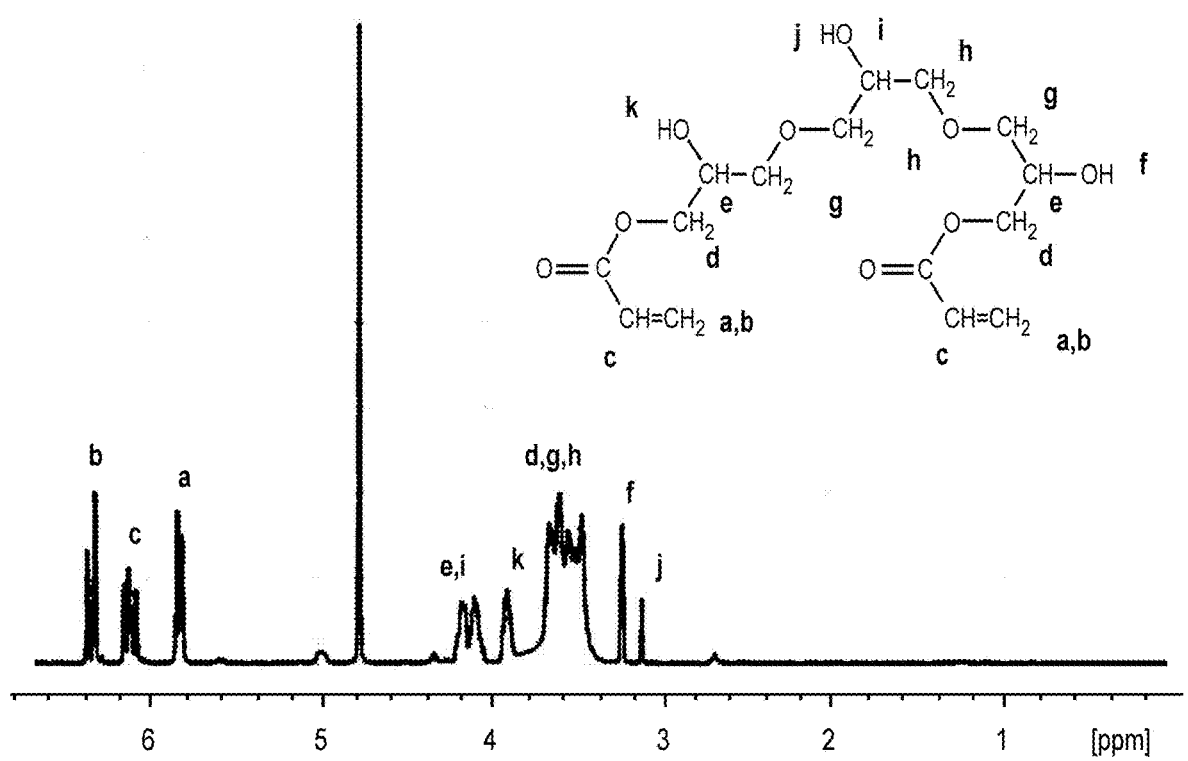
FIG. 4A shows the $^1$H NMR spectrum of TGD with solvent methanol-d4.
Figure 4B:
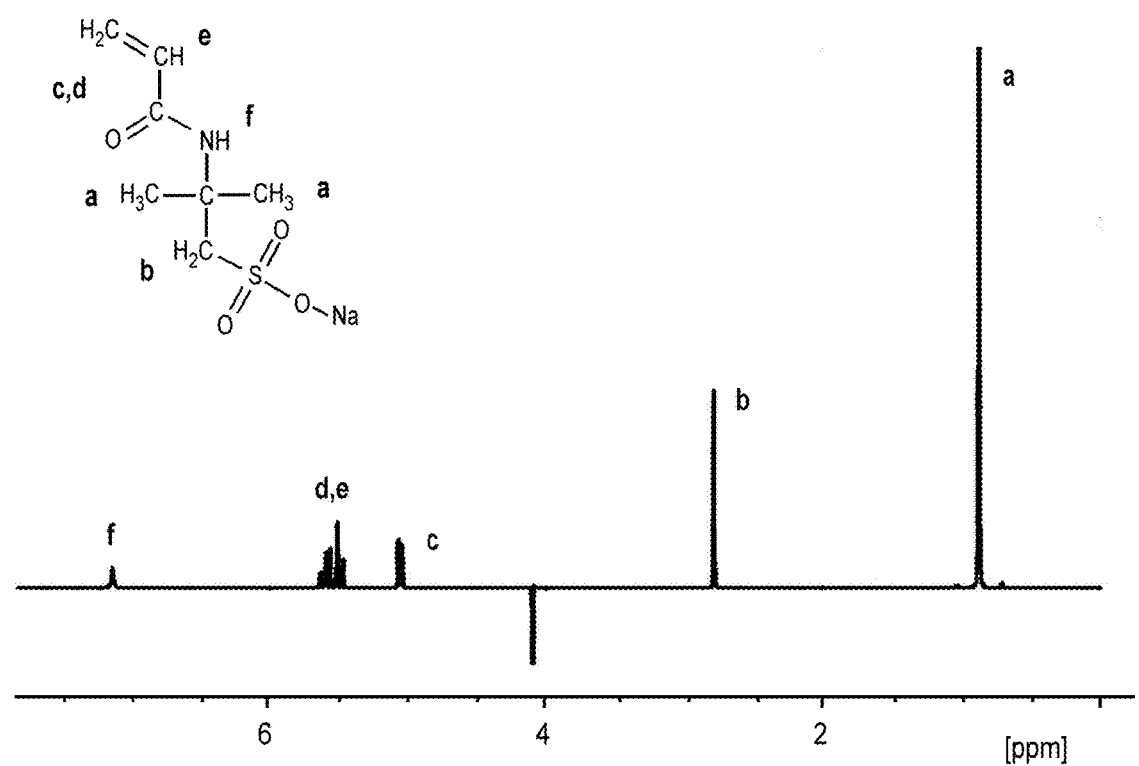
FIG. 4B shows the $^1$H NMR spectrum of AMPS with solvent water.
Figure 4C:
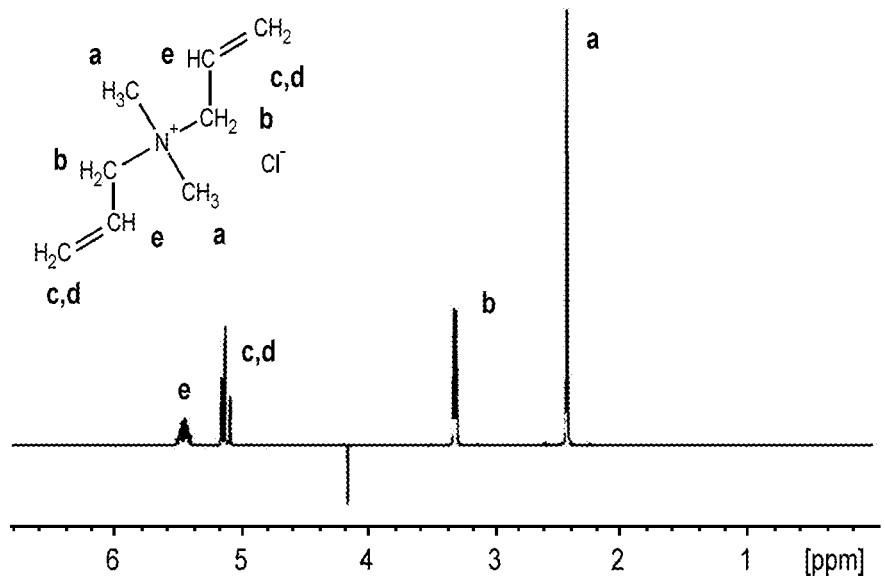
FIG. 4C shows the $^1$H NMR spectrum of DADC with solvent water.
Figure 5A:
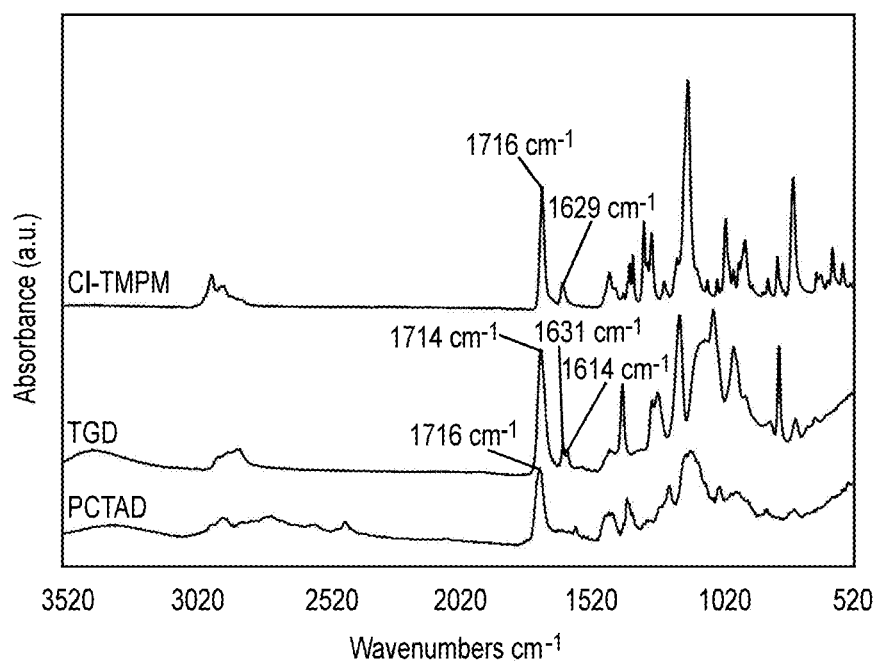
FIG. 5A shows a stacked FT-IR spectra of PCTAD, TGD, and Cl-TMPM.

FTIR and $^1$H NMR spectra of TGD and $^1$H NMR spectra of AMPS and DADC monomers were further recorded in addition to Cl-TMPM and PCTAD to better understand and discuss PCTAD's spectrum, structure, and chemical composition. The $^1$H NMR spectrum of the monomers TGD, AMPS, and DADC can be seen in FIGS. 4A, 4B, and 4C. The FTIR spectra of TGD, Cl-TMPM, and PCTAD can be seen in FIG. 5A. In the Cl-TMPM and TGD spectra, the peaks at 1629 cm-1 and 1631 cm-1, respectively, are related to carbon-carbon double bond stretching. Another peak can be seen in the TGD spectrum at 1614 cm-1 which also can be related to carbon-carbon double bond stretching. The peak at 1716 cm-1 is related to ester carbonyl present in the Cl-TMPM structure. This band can also be observed in TGD spectrum at 1714 cm-1 which can also be attributed to the presence of ester carbonyls in its structure. TGD contains 3 —OH groups which resulted in the wide band in 3200-3600 cm-1 region. These observations are reflected in the spectrum of PCTAD. The carbonyl ester and —OH band can be observed in the polymer's spectrum, however the carbon-carbon double bond stretching peak was not observed, which can be a sign that polymerization reaction went to completion.

Figure 5B:
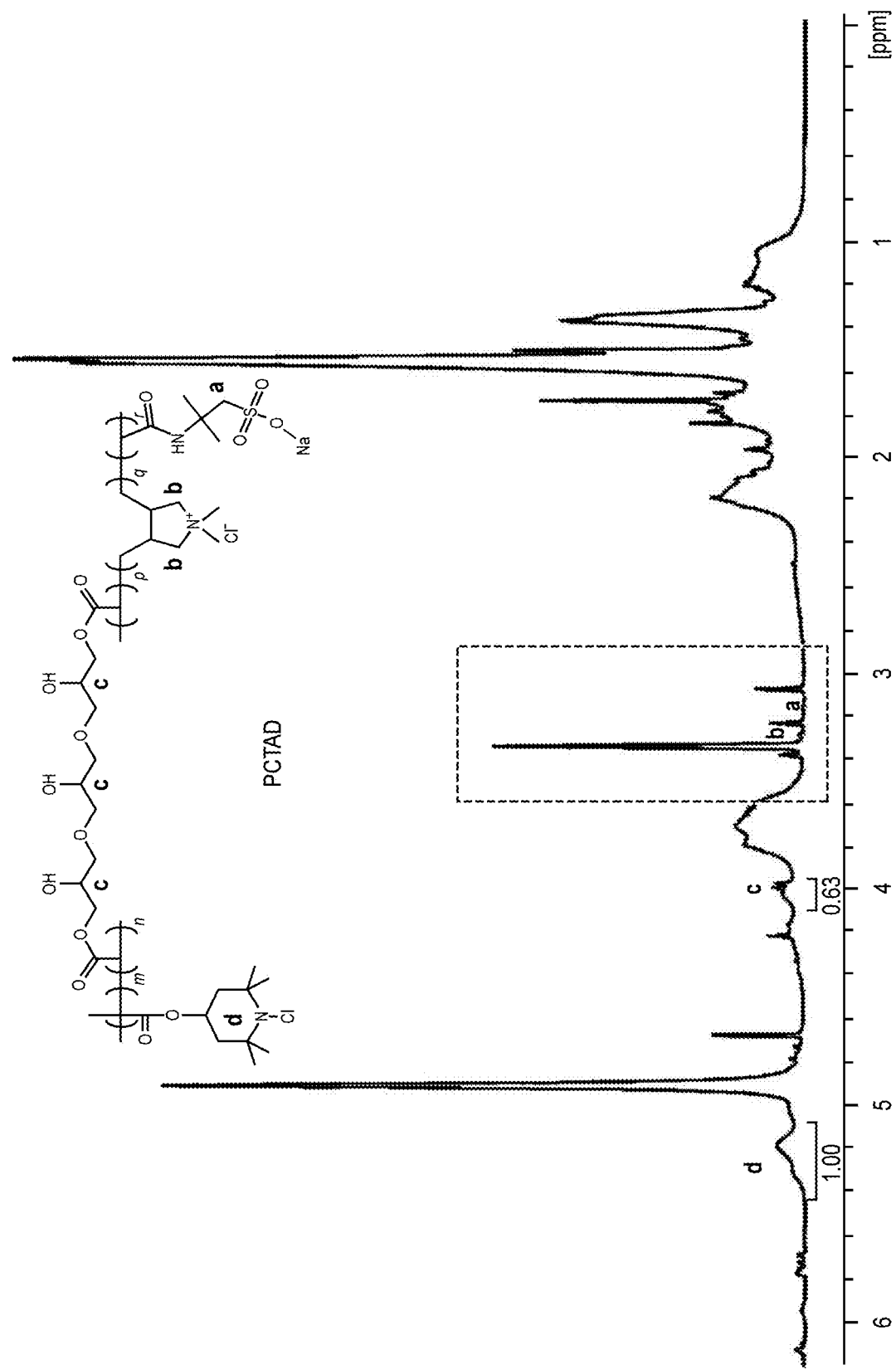
FIG. 5B shows the $^1$H NMR spectrum of PCTAD in methanol-d4.
Figure 5C:
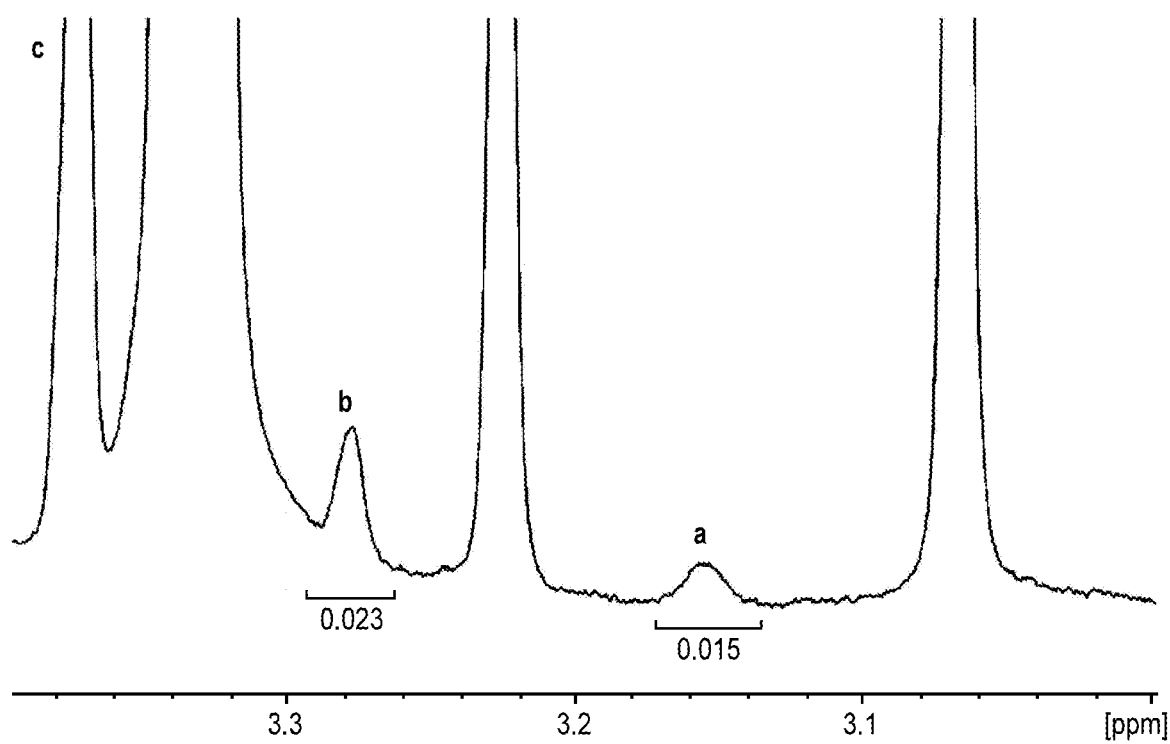
FIG. 5C shows a zoomed in portion of the highlighted area provided in FIG. 5B.

In addition, a series of small peaks can be observed in 2500-2900 cm-1 in the PCTAD spectrum which appear to be the result of formation of polymeric chains (C—H stretch). Although the FTIR characterization results seem to confirm the structure of final product, $^1$H NMR spectra was obtained to investigate PCTAD structure in more detail. FIGS. 5B and 5C show $^1$H NMR spectrum of PCTAD. The characteristic peaks of Cl-TMPM (δ 5.1-5.4), TGD (δ 3.9-4.1), DADC (δ 3.28), and AMPS (δ 3.15) were observed in the polymer chain. FIG. 5C is a zoomed in portion of the highlighted portion of the spectrum in FIG. 4B.

The ratio of monomers in the polymer chain was calculated by integrating the peaks in the NMR spectrum. The PCTAD chemical composition compared to monomers molar feed are reported in Table 3. The slight differences in feed and polymer composition can be caused by a variety of reasons such as differences in reactivity of monomers and reaction conditions. These characterizations showed that PCTAD was successfully synthesized. Without being limited to any particular mechanism or theory, due to the dual functionality of the TGD monomer as well as containing 3 hydroxyl functional groups, they are capable of creating a highly crosslinked polymers which can be beneficial for the final product in terms of stability and adhesion properties.

TABLE 3

| Monomer | Feed Composition (mol %) | PCTAD Composition (mol %) |
|---|---|---|
| Cl-TMPM | 82.77 | 81.75 |
| TGD | 15.55 | 17.17 |
| AMPS | 0.84 | 0.61 |
| DADC | 0.84 | 0.47 |

Although effective N-halamine polymers have been synthesized previously, those works have used dangerous and highly toxic chemicals, such as potassium or sodium cyanide, for synthesis of the final product which was not chlorinated and required a subsequent halogen treatment with dilute bleach or similar products. Further, emulsions of Cl-TMPM homopolymer in water have been prepared previously, however, a major drawback of an emulsion product is that the final product cannot be further modified and can only be used as-is, since diluting, concentrating, or changing any parameters of the emulsion will disturb the emulsion conditions and cause precipitation of product.

However, within the results of the example, PCTAD was successfully dissolved in water and 50% ethanol/water solution in various concentrations. The solubility of PCTAD is beneficial as water and ethanol/water are safe and easy-to-apply solvents for formulating quick-drying solutions. PCTAD is a more flexible product which is not only chlorinated, however, can also be handled as a solid or in solution in different concentrations.

Example 5

Shelf-Life Stability of PCTAD

The shelf-life stability of PCTAD was further analyzed. As described throughout the examples, analytical titration of chlorine measurement data was expressed as mean±standard deviation where applicable. The data were analyzed using the analysis of variance (ANOVA), and the differences were considered statistically significant if P<0.05. A total of n=4 was used for each test condition for analytical titration of chlorine measurement.

Figure 6:
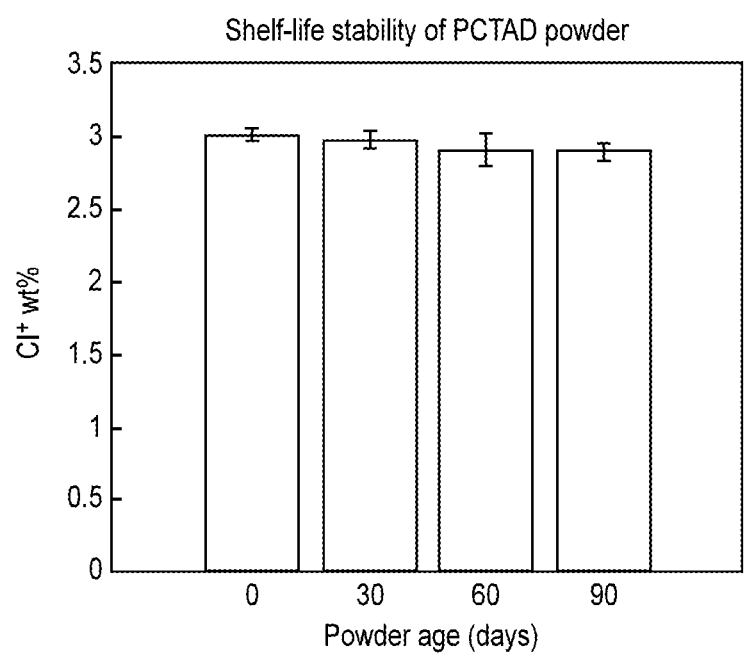
FIG. 6 shows a bar graph of the chlorine content of PCTAD powder at 0 days, 30 days, 60 days, and 90 days.

FIG. 6 shows the results of chlorine load of PCTAD powder at different time intervals in days. It can be observed that after 90 days of storage at room temperature, 97% of original chlorine content was retained. These results show that PCTAD powder has excellent storage and shelf-life stability at room temperature. This outstanding shelf-life storage stability is attributed to the complex structure of the polymeric backbone which can protect the N-chlorinated moiety of Cl-TMPM. Stability of chlorine in the N-halamine moiety was affected by environmental factors such as humidity, lighting, moisture, and temperature, etc. Without being limited to any particular mechanism or theory, PCTAD's polymeric chain can provide steric hinderance to the chlorine and acts as a reservoir delaying the release of chlorine, hence, increasing the shelf-life stability of PCTAD.

Example 6

Application of PCTAD as a Ready-to-Use N-halamine Antimicrobial Surface Spray

Materials: PCTAD was used to make spray solutions without further purification or modifications. Multipurpose 304 Stainless Steel (SS, Foil, 0.002" Thick) was purchased from McMaster-Carr Supply Company (Elmhurst, Illinois). All other materials, chemicals, and supplies including E. coli (ATCC® 8739), S. aureus (ATCC® 9144), and Titanium (Ti, foil, thickness 0.25 mm, 99.7% trace metals basis) were purchased from Sigma-Aldrich (St. Louis, MO).

Surface Chlorine Load Measurement: The chlorine load of samples was measured by the following iodometric/thiosulfate titration method. In general, known surface area of samples were added to a flask containing a solution of approximately 1 g potassium iodide, 10 ml DI water, 90 ml ethanol, and 1 ml of glacial acetic acid. Flasks were sealed and the mixture was shaken for 30 minutes at room temperature. Released iodine was titrated with a sodium thiosulfate aqueous solution with accurate known normality. Blank titrations on water samples were performed under the same conditions as control samples. The concentration of chlorine load per sample weight and number of chlorine atoms per surface area were calculated according to the following equations:

$$Cl^+ \% = \frac{N \times (V_{Cl} - V_0) \times 35.45}{w \times 2} \times 100 \quad (1)$$

$$Cl^+ (\text{atoms/cm}^2) = \frac{N \times (V_{Cl} - V_0)}{S \times 2} \times 6.022 \times 10^{23} \quad (2)$$

where N is the normality of sodium thiosulfate solution, VCl is the volume of sodium thiosulfate used for titration of final sample, $V_0$ is the volume of thiosulfate solution used for blank solution as the control, w is the sample weight, and S is the sample's surface area in $cm^2$.

Preparation of Polymer Spray Solutions: PCTAD was dissolved in 50% (v/v) ethanol in water solution at a 10 mg/ml concentration. The pH of the solution was adjusted to a neutral pH (~7) by adding concentrated acetic acid. The solution was then poured into small spray bottles.

Preparation of PCTAD Spray-treated Samples: Spray solutions were prepared as mentioned previously. Titanium (Ti) or stainless steel (SS) sheets were washed with soap and warm water followed by rinsing with ethanol or isopropanol and dried at room temperature before further use. 16 cm×8 cm pieces were spray-coated horizontally and let dry at room temperature. Coated samples were cut into appropriate coupons after drying at room temperature and used for further tests, including measurement of chlorine load, shelf-life stability, durability against heat, moisture, and UV, and antibacterial efficacy. In addition, coatings were characterized with FTIR.

Figure 7A:
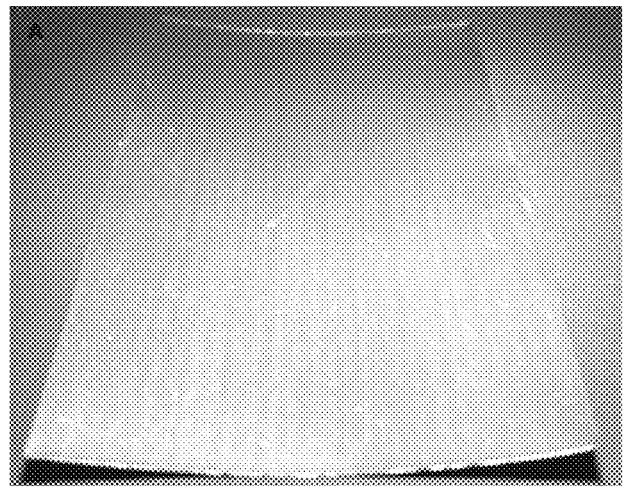
FIG. 7A is a photo showing a titanium surface without PCTAD coating.
Figure 7B:
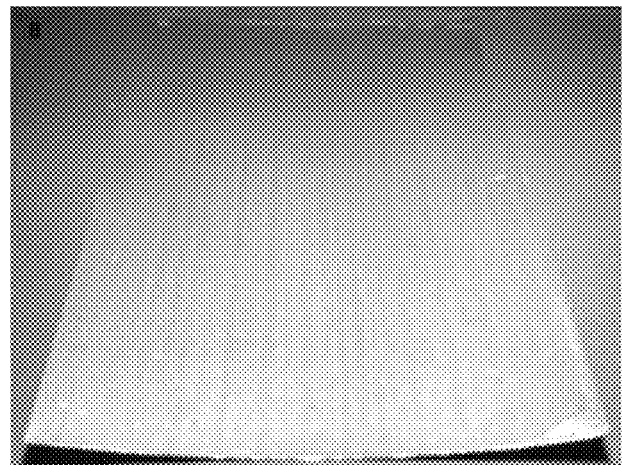
FIG. 7B is a photo showing a titanium surface with PCTAD coating.
Figure 7C:
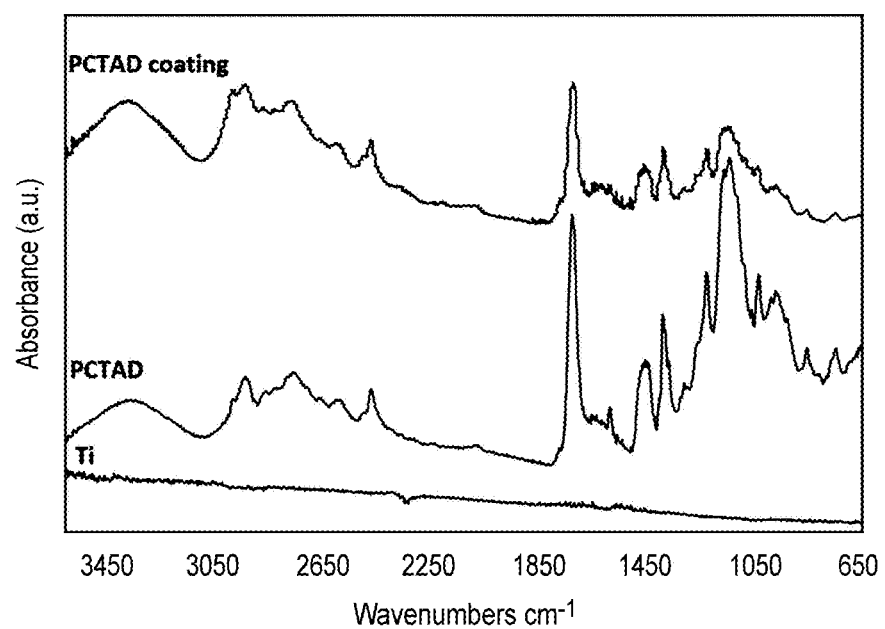
FIG. 7C is the FTIR spectra of titanium (Ti), PCTAD, and PCTAD coated on titanium.

Characterization of Coating: The appearance of the coatings is shown in FIG. 7A and FIG. 7B. FIG. 7A shows a surface of uncoated Ti, and FIG. 7B shows the surface with coated Ti. The coatings left a transparent and smooth layer on the surface of the Ti sheet as shown in FIG. 7B. In addition, FIG. 7C shows the FTIR of the PCTAD-coated Ti sheets, showing the FTIR spectra of Ti, PCTAD, and PCTAD coated on Ti. The FTIR spectrum of PCTAD coating correlated with that of PCTAD powder, indicating successful coating on Ti substrates.

Stability of PCTAD in Solution, Spray-treated Surfaces, and their Durability in Harsher Conditions: Solutions were stored in clear spray bottles, and spray-treated surfaces were stored on a laboratory bench top where they were exposed to air. All samples were stored at room temperature and under ambient room lighting. In order to evaluate durability against heat, spray-treated samples were put in a regular oven at 70° C. and 60% RH for 14 days. In order to evaluate the durability of spray-treated samples against moisture, ASTM D 2247-02 method was followed with some modifications. Coated specimens were placed in a regular oven set to 37° C. containing a heated mixture of air and water vapor for 24 hours. In order to provide 100% RH in the oven, a glass container filled with DI water was put on the bottom rack of oven. At the end of test, samples were taken out of the oven and left to cool down for 1 hour before any further testing.

To evaluate durability against UV, spray-treated substrates were exposed to UV light for up to 24 hours. Durability of spray-treated samples against wet and dry touch was evaluated by touching coated substrates several times every 1 hour within a five-hour time span. All samples were tested for remaining oxidative chlorine by following an iodometric/thiosulfate titration procedure.

Figure 8A:
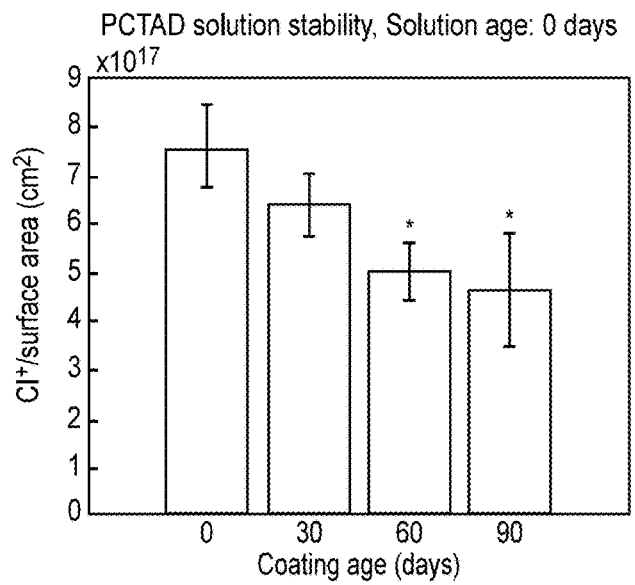
FIG. 8A is a graph showing the chlorine content of spray-coated substrates when the PCTAD solution was stored for 0 days. Data that are significantly different than the chlorine content at day 0 are marked with an asterisk (*) with $P<0.05$.
Figure 8B:
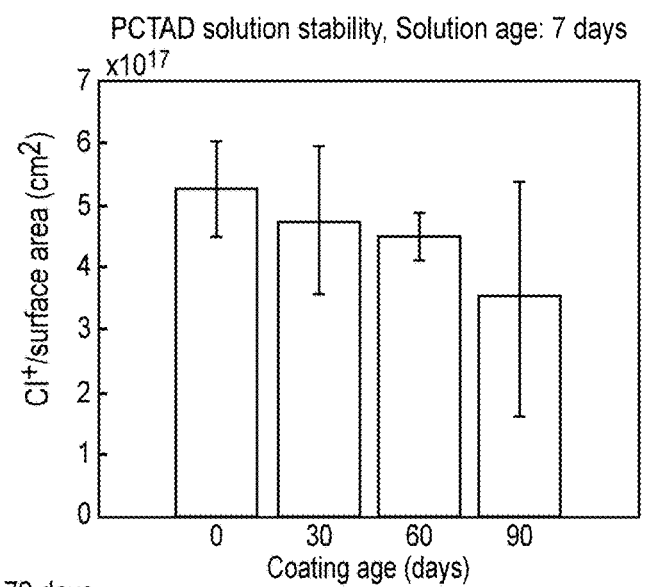
FIG. 8B is a graph showing the chlorine content of spray-coated substrates when the PCTAD solution was stored for 7 days. Data that are significantly different than the chlorine content at day 0 are marked with an asterisk (*) with $P<0.05$.
Figure 8C:
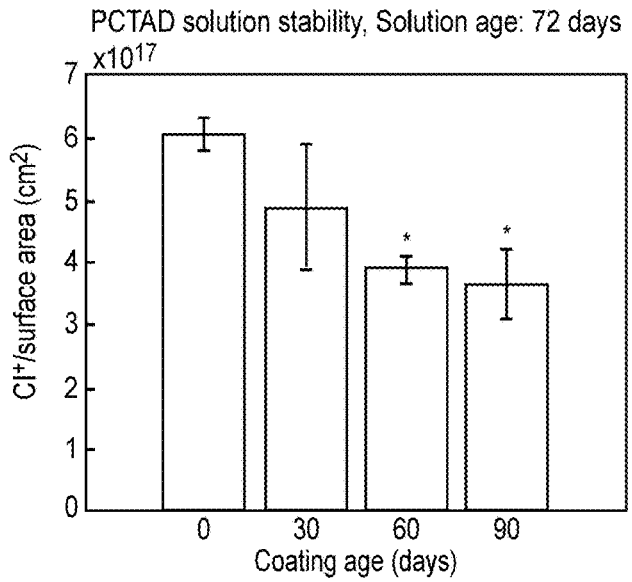
FIG. 8C is a graph showing the chlorine content of spray-coated substrates when the PCTAD solution was stored for 72 days. Data that are significantly different than the chlorine content at day 0 are marked with an asterisk (*) with $P<0.05$.

The stability of the PCTAD coating's oxidative chlorine can be observed in FIGS. 8A, 8B, and 8C. FIGS. 8A, 8B, and 8C show the PCTAD solution stability with a solution age of 0 days, 7 days, and 72 days, respectively. As shown in the figures, it can be observed that there was no significant reduction in chlorine load of the coatings when substrates were coated with solutions of different storage times. However, it can be observed that the coatings stored for longer durations contained less chlorine than freshly coated surfaces. This correlates with the data shown in FIG. 8A-8C, where PCTAD's chlorine slightly decreased over time, which potentially resulted in coatings with less chlorine atoms. Although significant changes have been observed after statistical analysis, the average number of chlorine atoms per surface area of samples did not fall below $3\times10^{17}$ atoms/$cm^2$ after 90 days of solution storage which provided sufficient chlorine atoms to render antibacterial properties. Therefore, the spray solutions showed good shelf-life stability with no significant difference observed between a 72 day-old solution and a freshly made solution.

Figure 9A:
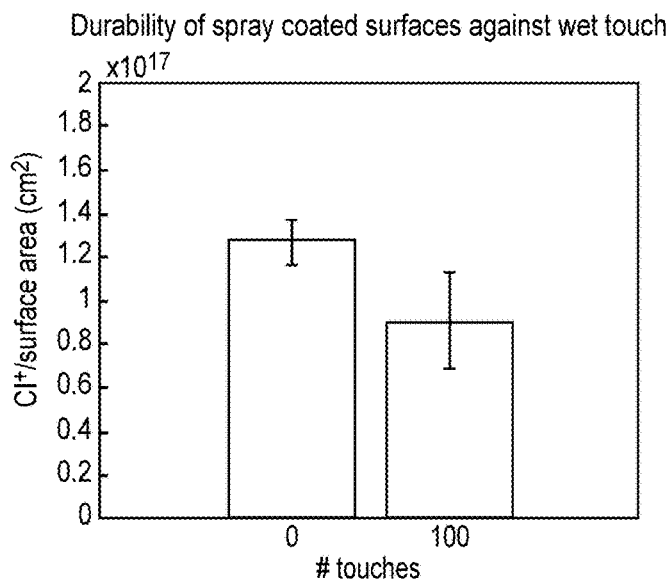
FIG. 9A is a graph showing the durability of PCTAD spray-treated surfaces against wet touch after 0 touches and 100 touches.
Figure 9B:
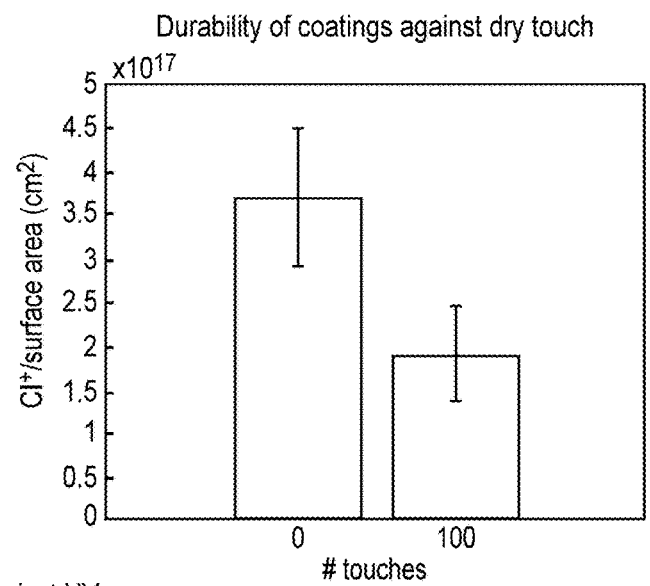
FIG. 9B is a graph showing the durability of PCTAD spray-treated surfaces against dry touch after 0 touches and 100 touches.
Figure 9C:
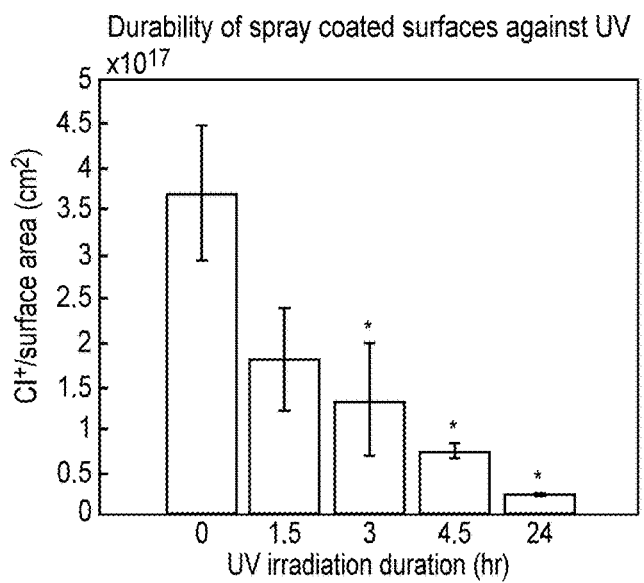
FIG. 9C is a graph showing the durability of PCTAD spray-treated surfaces against UV irradiation after 0, 1.5, 3, 4.5, and 24 hours. Data that are significantly different than the chlorine content at day 0 are marked with an asterisk (*) with $P<0.05$.

In order to simulate application of this product in harsher conditions, durability of spray coated samples were tested against heat, humidity, UV, and wet and dry touch by testing their remaining chlorine load. After storing the PCTAD solution for 72 days, it was used to coat the surface of Ti or SS substrates. Results are demonstrated in FIGS. 9A, 9B, 9C, 9D, and 9E. Further, it can be seen from FIG. 9B that the spray-coated surfaces demonstrated durability against 100 dry touches over a 5-hour time span. This is a critical feature that makes the spray compositions of the present disclosure suitable for high-touch surfaces. In addition, spray coated substrates were exposed to UV irradiation for 24 hours to evaluate their durability to UV light. As shown in FIG. 9C, it was found that the chlorine load of the coating was not significantly decreased after 4.5 hours of exposure to UV. However, after continuous irradiation for 24 hours, chlorine load was significantly reduced. This demonstrates that the coatings can maintain their chlorine load after several hours of UV irradiation.

Figure 9D:
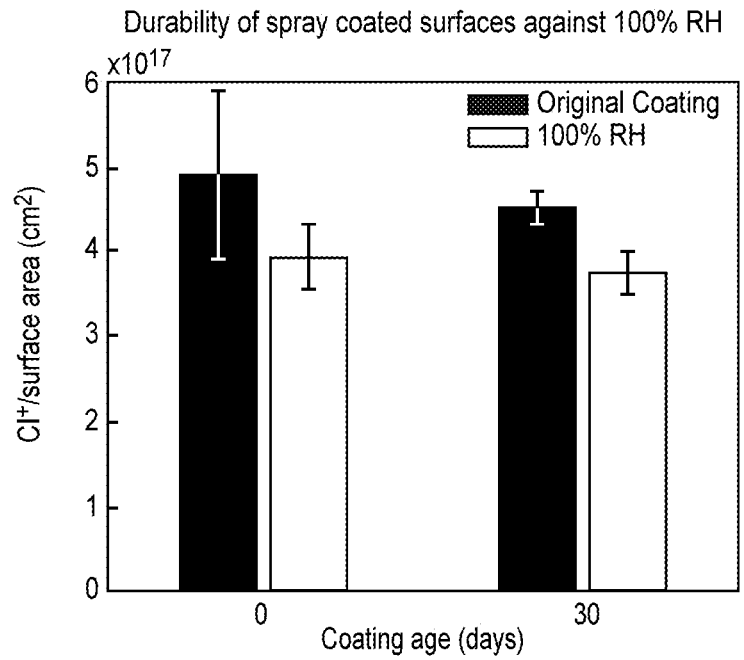
FIG. 9D is a graph showing the durability of PCTAD spray-treated surfaces against 100% relative humidity (RH). The graph provides a comparison between the original PCTAD coated surface and a 100% RH PCTAD coated surface. Data is shown for both PCTAD coating stored at 0 days and 30 days.
Figure 9E:
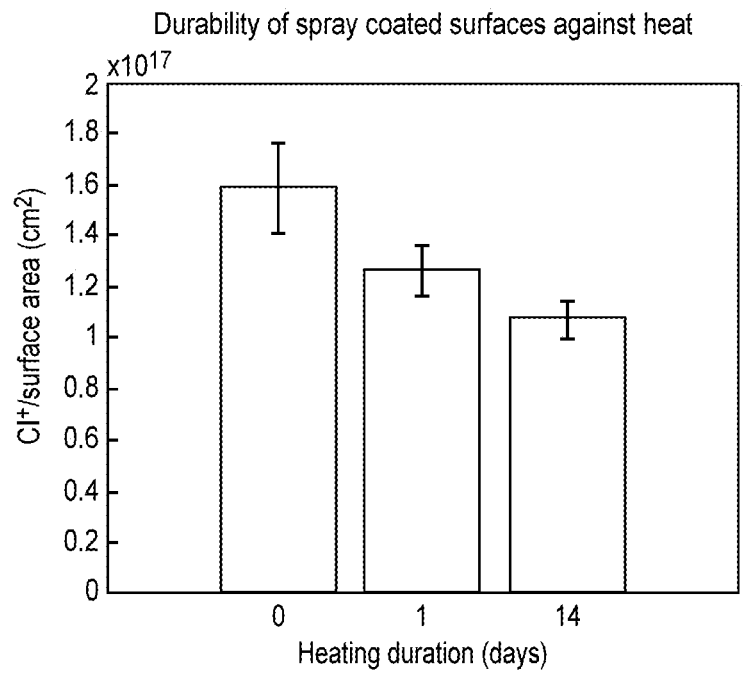
FIG. 9E is a graph showing the durability of PCTAD spray-treated surfaces against heat with a heat duration of 0 days, 1 day, and 14 days.

FIG. 9D further shows that the coatings demonstrate good durability against moisture. However, the reduction in chlorine load may be due to exposing the coating to high humidity, which caused formation of condensation on samples, potentially dissolving and washing off some of the coating. Nevertheless, it can be understood from FIG. 9D that exposing the coating to 100% humidity does not significantly affect chlorine atoms per surface area of specimens, showing durability of this coating in harsher conditions. Lastly, as shown in FIG. 9E, it was found that the spray-coated substrates further demonstrated good durability against heat for at least 2 weeks.

In some aspects, this outstanding stability can be attributed to the presence of TGD in the structure of PCTAD which potentially lead to crosslinking. Crosslinked polymers exhibit superior physical and chemical properties compared to non-crosslinked polymers. On the other hand, TGD contains 3 hydroxyl groups which makes it a hydrophilic molecule capable of crosslinking with hydrophilic surfaces and substrates. As a result, without being limited to a particular mechanism or theory, polymerizing Cl-TMPM with TGD will not only make it hydrophilic but it will also increase stability of PCTAD in different conditions.

Antibacterial Efficacy Test: *E. coli* (ATCC® 8739), a gram-negative bacterium, and *S. aureus* (ATCC® 9144), a gram-positive bacterium, were used as exemplary microorganisms for antibacterial studies. A "sandwich test" was used to evaluate the antibacterial efficacy of the coatings. A single colony of the bacteria was transferred to 15 mL of brain heart infusion (BHI) broth and incubated at 37° C. overnight. The culture was pelleted through centrifugation, washed twice with phosphate-buffered saline solution (PBS), and resuspended in PBS buffer. A 10 μL aliquot of the inoculum ($10^5$-$10^6$ CFU/mL bacteria) was added to the center of the 2 cm×2 cm square coupon, a second identical coupon was placed on the sample, and the sandwich was compressed with a sterile weight to ensure complete contact with inoculated bacteria. At the contact times of one and five minutes, the coupons were placed in a PBS solution containing 0.01 N sodium thiosulfate and vigorously vortexed in order to quench any remaining chlorine to stop its activity and to detach surviving bacteria from the sample. Thereafter, ten-fold serial dilutions were made for all samples and each dilution was plated on tryptic soy agar plates. The plates were incubated at 37° C. for 24 h and bacterial colonies were counted for biocidal efficacy analysis. Uncoated control samples were treated similar to the coated samples. Antibacterial efficacy was reported as a log reduction of bacterial colonies. A total of n=4 was used for each test condition for analytical titration of chlorine measurement and antibacterial efficacy tests.

Initially, antibacterial efficacy was assessed after 1 minute of contact time between the bacteria and coated surfaces. Some reduction in bacteria colony units was observed after 1 minute of contact time. However, in order to kill all bacteria colonies, contact time was increased to 5 minutes. The results showing the antibacterial efficacy of SS or Ti coatings reported as a log reduction can be seen in Table 4 below. As shown within the table, all bacteria colonies (~5 logs) were inactivated after 5 minutes of contact time between the bacteria and coatings. Two experiments were conducted on different days, however, utilized the same procedure.

TABLE 4

| Samples | Contact Time (min) | Experiment 1 (log reduction) | | Experiment 2 (log reduction) | |
|---|---|---|---|---|---|
| | | E. coli | S. aureus | E. coli | S. aureus |
| Control-Bare | 1 | 0.03 | 0.02 | 0.01 | 0.01 |
| | 5 | 0.51 | 0.64 | 0.72 | 0.46 |
| 0-day stored spray | 1 | 1.35 | 1.32 | 0.75 | 1.04 |
| | 5 | 5.18 | 5.15 | 5.11 | 5.04 |
| 7-day stored spray | 1 | 1.35 | 1.02 | 1.11 | 0.67 |
| | 5 | 5.18 | 5.15 | 5.11 | 5.04 |
| 72-day stored spray | 1 | 0.81 | 1.15 | 0.81 | 1.52 |
| | 5 | 5.18 | 5.15 | 5.11 | 5.04 |
| Heated (14 days) | 1 | 0.68 | 1.04 | 0.97 | 1.61 |
| | 5 | 5.18 | 5.15 | 5.11 | 5.04 |
| 100% RH (24 hours) | 1 | 1.06 | 1.65 | 1.11 | 1.52 |
| | 5 | 5.18 | 5.15 | 5.11 | 5.04 |
| Wet touch (100 touches) | 1 | 0.74 | 1.64 | 1.23 | 1.14 |
| | 5 | 5.18 | 5.15 | 5.11 | 5.04 |
| Dry touch (100 touches) | 1 | 0.85 | 1.14 | 1.67 | 1.23 |
| | 5 | 5.18 | 5.15 | 5.11 | 5.04 |
| UV irradiated (24 hours) | 1 | 0.61 | 0.86 | 1.02 | 0.95 |
| | 5 | 5.18 | 5.15 | 5.11 | 5.04 |

These results show that the antibacterial efficacy of the PCTAD coatings was not affected by different conditions or environments as shown within Table 4. All these coatings contained at least $5\times10^{16}$ Cl atoms/cm$^2$, which appeared to be sufficient for total bacterial kill within 5 minutes of contact time between the coatings and bacteria colonies. Therefore, the results demonstrated that the spray-treated samples were able to achieve total kill (~5 to 6 log reduction) of both gram-positive and gram-negative bacteria within five minutes of contact time.

Example 7

Application of PCTAD as a Ready-to-Use N-halamine Antimicrobial to Latex Paint

Materials: PCTAD was used as a paint additive without any further modifications. Multipurpose 304 Stainless Steel (SS, Foil, 0.002" Thick) was purchased from McMaster-Carr Supply Company (Elmhurst, Illinois). Ultra Pure White Ceiling Flat Interior Paint (Behr® Paint Company), Color-Place ULTRA White Interior Paint & Primer in One (Masterchem Industries, LLC.), and CoteAll Multi-Purpose Alkyd Enamel White paint (Diamond Vogel) were used as the latex paints. All other materials, chemicals, and supplies including *E. coli* (ATCC® 8739), *S. aureus* (ATCC® 9144), and Titanium (Ti, foil, thickness 0.25 mm, 99.7% trace metals basis) were purchased from Sigma-Aldrich (St. Louis, MO).

Surface Chlorine Load Measurement: The chlorine load of samples was measured by following an iodometric/thiosulfate titration method. In general, a known surface area of samples were added to a flask containing a solution of approximately 1 g potassium iodide, 10 ml DI water, 90 ml ethanol, and 1 ml of glacial acetic acid. Flasks were sealed and the mixture was shaken for 30 minutes at room temperature. Released iodine was titrated with a sodium thiosulfate aqueous solution with accurate known normality. Blank titrations on water samples were performed under the same conditions as control samples. The concentration of chlorine load per sample weight and number of chlorine atoms per surface area were calculated according to the following equations:

$$Cl^+ \% = \frac{N \times (V_{Cl} - V_0) \times 35.45}{w \times 2} \times 100 \quad (1)$$

$$Cl^+ (atoms/cm^2) = \frac{N \times (V_{Cl} - V_0)}{S \times 2} \times 6.022 \times 10^{23} \quad (2)$$

where N is the normality of sodium thiosulfate solution, $V_{Cl}$ is the volume of sodium thiosulfate used for titration of final sample, $V_0$ is the volume of thiosulfate solution used for blank solution as the control, w is the sample weight, and S is the sample's surface area in $cm^2$.

Preparation of Latex Paint mixed with PCTAD: An appropriate amount of PCTAD polymer was dissolved in 50 wt % ethanol in water solution and used to make 2 wt % latex paint mixtures. PCTAD solution and paints were mixed by adding the solution to paint and stirring with an overhead paint mixer. The addition of PCTAD to latex paints caused increased viscosity of the paint, therefore, in order to decrease paint viscosity, water was added to the paint mixtures to thin them according to the instructions on the paint labels. Mixed paints were used immediately after preparation of the paint substrates.

For example, in order to prepare 500 g of antimicrobial paint based on Behr Ultra Pure White Ceiling Flat Interior Paint, 10 g PCTAD was dissolved in approximately 20 ml of 50% ethanol in water solution and added to 420 g of paint. Approximately 30 g of water was added to decrease the viscosity of final mixture.

Preparation of Painted Substrates: PCTAD paints were used to paint SS or Ti substrates. Bare paint was used to paint similar surfaces for preparation of the control samples. Painted substrates were let dry at room temperature for 7 days before using for further tests.

Stability of Painted Surfaces and their Durability in Harsher Conditions: Painted substates were stored at room temperature and humidity (RH=60%) where they were exposed to air and laboratory lighting. The durability of painted substrates was evaluated against elevated temperature and UV irradiation. In this regard, substrates were heated at 70° C. for 14 days in an oven with open airflow. The remaining chlorine load of paints were measured at different intervals. Further, painted substrates were exposed to UV irradiation for 72 hours and remaining chlorine load of samples were examined at different intervals.

The visual appearance of painted substrates mixed with PCTAD can be seen in FIGS. 10A, 10B, and 10C. FIG. 10A shows bare paint (top sample) versus the mixed paint with PCTAD (bottom sample). FIG. 10B shows PCTAD mixed paint on wallpaper, and FIG. 10C shows PCTAD mixed paint on plastic. It can be observed that the mixing procedure does not cause paint discoloration or unwanted changes in the appearance of mixed paint or painted substrates.

The painted substrates were evaluated by measuring their remaining chlorine load following the iodometric/thiosulfate titration test. The stability of the painted substrates was evaluated, and the results are shown in FIG. 11. As shown within FIG. 11, after 90 days of storage, chlorine load of painted substrates did not reduce significantly, demonstrating their long shelf-life stability under normal conditions.

Figure 12A:
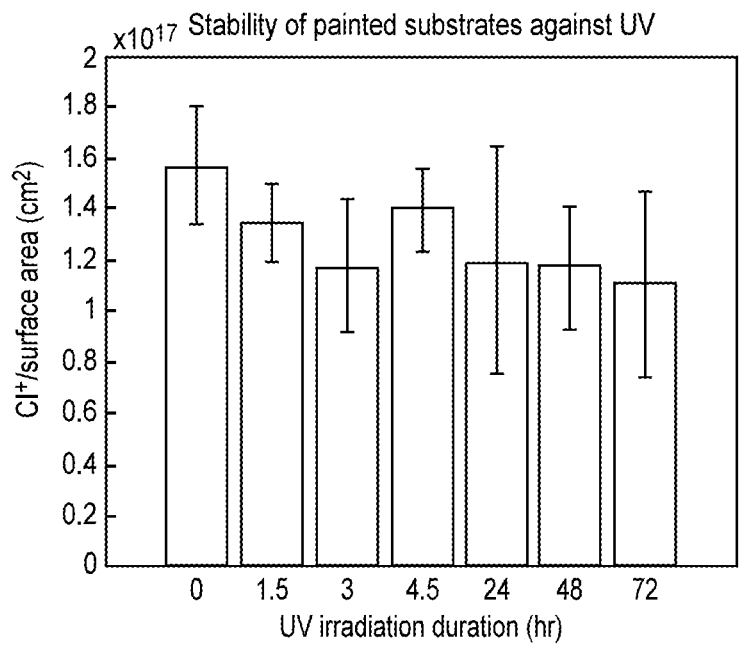
FIG. 12A is a graph showing the stability of painted substrates against UV irradiation at a duration of 0, 1.5, 3, 4.5, 24, 48, and 72 hours.
Figure 12B:
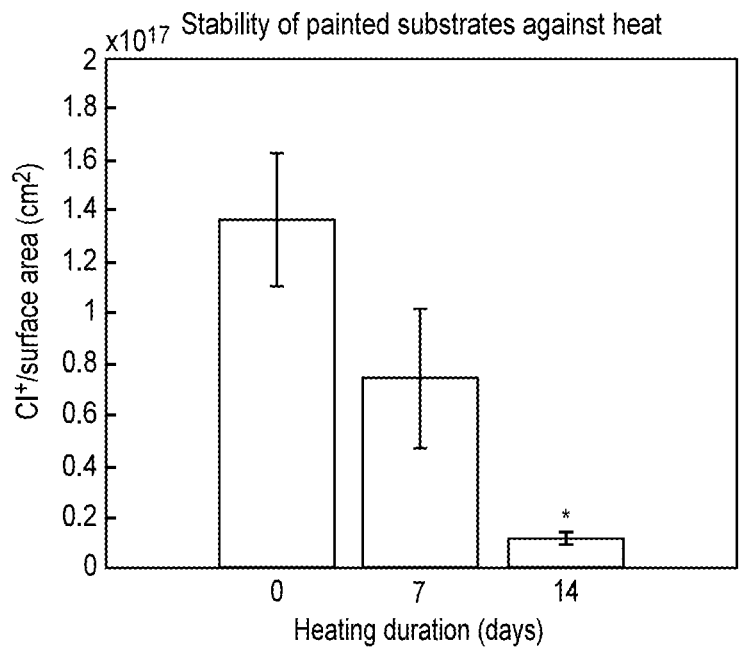
FIG. 12B is a graph showing the stability of painted substrates against heat at 0, 7, and 14 days. Data that are significantly different than the chlorine content at day 0 are marked with an asterisk (*) with $P<0.05$.

The durability of the painted substrates was assessed against UV irradiation and elevated temperatures. Results are illustrated in FIGS. 12A and 12B. FIG. 12A shows the durability of painted surfaces observed against UV irradiation. As shown in the figure, the painted substrates exhibited outstanding durability against UV without any significant reduction in chlorine after 72 hours of irradiation. Additionally, it can be seen in FIG. 12B that painted substrates show good resistance against heat after 7 days of exposure where chlorine load does not reduce significantly. However, continuous heating for 14 days caused significant reduction in chlorine load compared with paints at day 0.

Comparing the durability results of painted substrates (present Example) with spray coated samples (Example 6), it can be seen that these two coatings behave differently when exposed to UV and elevated temperature. These differences may be related to the composition of the paint and the spray formulation. In some embodiments, paint contains ingredients such as titanium dioxide and calcium carbonate which can protect the oxidative chlorine in PCTAD structure from UV, hence, increasing its resistance against UV. On the other hand, the absence of these ingredients in the surface spray formulation can result in better adhesion of PCTAD to the coating substrate, thus protecting the oxidative chlorine from detaching from the coating and being released.

Beneficially, the incorporation of a copolymer composition into paint provided an easy to reproduce method that could be followed by either professionals or non-professional consumers. Further, the mixed paint was easily applied on different substrates, such as plastics and metals. The painted substrates showed good stability under normal conditions where they were able to retain more than 95% of their oxidative chlorine after 90 days of storage under normal laboratory conditions.

Rechargeability of Painted Surfaces: In order to confirm the rechargeability of the painted surfaces, the painted surfaces were submerged in a 0.1 N solution of sodium thiosulfate solution for 2 hours with shaking to forcefully release their chlorine. In order to recharge the samples, the painted surfaces were sprayed with store-bought bleach spray and let dry at room temperature. Thereafter, samples were rinsed with copious amount of water and airdried. This procedure was repeated three times.

Figure 13:
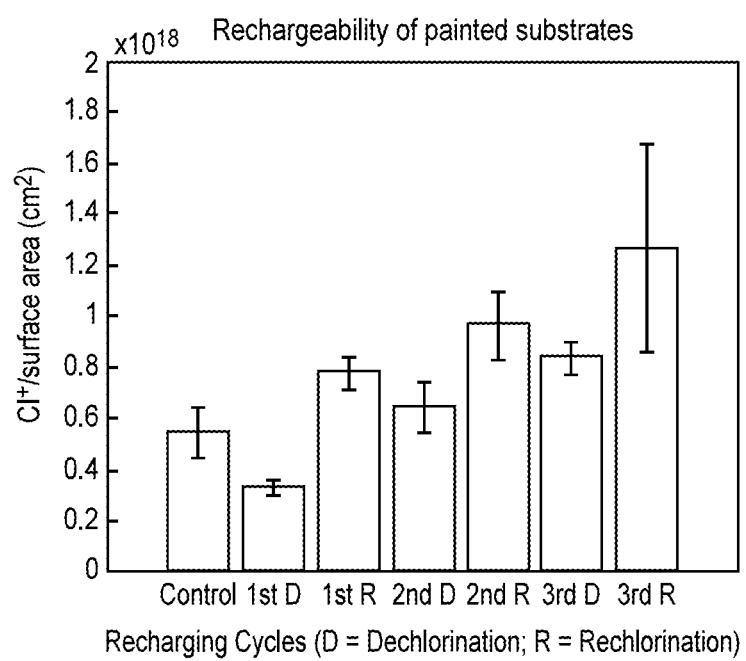
FIG. 13 is a graph showing the rechargeability of painted substrates with PCTAD following three recharging cycles.

The most important feature of the painted substrates is attributed to their recharging ability. Even after all or most of the chlorine is exhausted, the painted substrate can be recharged or re-activated via a treatment comprising a source of free chlorine, such as household bleach, bleach spray, or bleach wipes. In order to simulate the loss of chlorine, painted samples were exposed to sodium thiosulfate, which is known to facilitate chlorine release and eventual neutralization. Although the treatment with sodium thiosulfate was not the main focus of the Example, it can be observed in FIG. 13 that after exposure to sodium thiosulfate, the chlorine load of samples did not reduce significantly, attributing to the strong stability of chlorine in these paints against harsh environmental conditions. As shown in FIG. 13, the rechargeability of painted substrates is provided at either the dichlorination or rechlorination step of the recharging cycle. As disclosed herein, the stability may be related to the structure of PCTAD. Not only did PCTAD as a powder and in solution demonstrate outstanding stability, but this stability can also be further seen when it is mixed with latex paint.

It can be observed in FIG. 13 that after exposing paints to sodium thiosulfate, chlorine is decreased, as expected. After exposing the de-charged paints to free chlorine by spraying them with bleach spray, the chlorine load of paints increased. The decharge-recharge cycle was repeated 3 times and paints were recharged each time as shown in FIG. 13. Additionally, it can be seen that after the first recharge, paints have more chlorine per surface area than the control sample. This can be caused by Cl-TMPM chlorine loss during the polymerization reaction. In the polymerization process, as mentioned earlier, Cl-TMPM is exposed to heat for several hours as well as side reactions in the reaction mixture which might facilitate chlorine loss. As a result, the final polymer (PCTAD) will not be fully chlorinated. Therefore, the results demonstrate that the decharge-recharge cycles can result in loading chlorine to the fullest capacity to recharge the painted surface treated with PCTAD.

Antibacterial Efficacy Test: A similar procedure that was mentioned previously in Example 6 for the evaluation of antibacterial efficacy of coatings was followed in this Example. *E. coli* (ATCC® 8739) and *S. aureus* (ATCC® 9144) were used as model microorganisms for antibacterial studies. The "sandwich test" was further used in this Example to evaluate the antibacterial efficacies of the painted surfaces.

Tests were conducted after 5 and 20 minutes of contact time. At these contact times, samples were placed in a PBS solution containing 10 ml 0.05 wt % sodium thiosulfate and vigorously vortexed in order to quench any remaining chlorine to stop its activity and to detach surviving bacteria from the sample. Thereafter, ten-fold serial dilutions were made for all samples and each dilution was plated on tryptic soy agar plates. The plates were incubated at 37° C. for 24 hours and bacterial colonies were counted for biocidal efficacy analysis. Substrates that were painted using bare paint were used as control samples and were treated similar to the PCTAD paint samples.

Based on antibacterial efficacy results that were obtained for spray coated surfaces, antibacterial efficacy tests were initially conducted after 5 minutes of contact time between samples and bacterial colonies. However, it was determined that this contact time was not sufficient to deactivate all the bacteria. As a result, contact time was increased to 20 minutes at which point, the painted substrates were able to inactivate all the bacterial colonies (approximately 5-6 log reduction). The results can be observed in Table 5. Table 5 shows the antibacterial efficacy of the painted substrates reported as a log reduction. Two experiments were conducted following the same procedure for each experiment.

TABLE 5

| Samples | Contact Time (min) | Experiment 1 (log reduction) | | Experiment 2 (log reduction) | |
|---|---|---|---|---|---|
| | | E. coli | S. aureus | E. coli | S. aureus |
| Control-Bare paint | 5 | 1.25 | 0.94 | 1.54 | 0.87 |
| | 20 | 2.1 | 1.95 | 1.84 | 1.76 |
| 90-day stored | 5 | 1.35 | 1.32 | 0.75 | 1.04 |
| | 20 | 5.72 | 5.99 | 5.88 | 5.78 |
| Heated (7 days) | 5 | 1.35 | 1.02 | 1.11 | 0.67 |
| | 20 | 5.72 | 5.99 | 5.88 | 5.78 |

TABLE 5-continued

| Samples | Contact Time (min) | Experiment 1 (log reduction) | | Experiment 2 (log reduction) | |
|---|---|---|---|---|---|
| | | E. coli | S. aureus | E. coli | S. aureus |
| UV irradiated | 5 | 0.81 | 1.15 | 0.81 | 1.52 |
| (72 hours) | 20 | 5.72 | 5.99 | 5.88 | 5.78 |
| Recharged | 5 | 0.68 | 1.04 | 0.97 | 1.61 |
| (3 cycles) | 20 | 5.72 | 5.99 | 5.88 | 5.78 |

As shown in Table 5, the antibacterial efficacy tests demonstrated that PCTAD-treated paints were able to inactivate 5 to 6 logs of both gram-positive and gram-negative bacteria within 20 minutes contact time.

Example 8

Application of PCTAD as a Ready-to-Use N-Halamine Antimicrobial Additive to Floor Finishing The compatibility and efficacy of PCTAD was further evaluated as an additive to floor finishing products. In this example, three floor finishing samples were tested for solubility and compatibility. About 1 wt % floor finishing formulations were prepared by mixing PCTAD powder into each floor finishing sample. The PCTAD-treated floor finishing sample was then applied to Vinyl flooring and wooden floor samples.

After application of the PCTAD-treated floor finishing samples to the floor samples, no discoloration or any other alterations were observed in the floor finishing solution or the coated floor sample surfaces. Further, levels of chlorine on the treated surface were tracked by using iodine staining to show a color change. For both the PCTAD coated vinyl floor and the PCTAD coated wooden floor, a distinct color change was observed on all three floor finishing samples, demonstrating the stability of chlorine within the floor finishing samples via the iodine staining test. Further, chlorine was retained for at least 7 days. As further demonstrated by iodine staining, the PCTAD coating further showed good stability at room conditions for 30 days. The Example demonstrated that PCTAD could be effectively incorporated as an antimicrobial additive to floor finishings, such as water-based floor finishings.

Example 9

Application of PCTAD as a Ready-to-Use N-halamine to Inactivate Virus

Four virus strains were tested to evaluate the anti-viral efficacy and compatibility of PCTAD. The four virus strains can be found in Table 6, in addition to their respective minimal inhibitory concentrations.

TABLE 6

| Virus strain | Minimal inhibitory concentration |
|---|---|
| A/California/04/2009 (H1N1pdm) | 1.25 mg/mL |
| A/Brisbane/02/2018 (H1N1pdm) | 1.25 mg/mL |
| A/Hong Kong/2671/2019 (H3N2) | 0.625 mg/mL |
| A/Cambodia/E0826360/2020 (H3N2) | 1.25 mg/mL |

The viruses represented in Table 6 include the major circulating strains over the past few years. The H1N1 viruses are from 2009 and 2018, and the H3N2 viruses are from 2019 and 2020. These further represent viruses that were/are circulating in 2022 and 2023.

PCTAD water solution samples were prepared for the virus inactivation test/neutralization test. Both freshly made and 12-month-old PCTAD water samples were tested at a concentration of 20 mg/ml. The PCTAD water solution samples were serially diluted using a $\log_2$ dilution scheme starting at the 20 mg/mL concentration. To each dilution was added 100 tissue culture infectious dose 50 ($TCID_{50}$). The samples were then incubated for 2 hours at 37° C. The mixture was then removed to let the cells incubate overnight at 37° C.

To detect infected cells, monoclonal antibodies were used against influenza nucleoprotein. Cell viability was confirmed using an MTT assay. The results showed that both the freshly made and 12-month-old PCTAD water samples performed similarly in the virus inactivation test. The PCTAD water solution samples demonstrated antiviral capabilities with solution stability under normal storage conditions for 15 months. Further, the level of chlorine could be easily traced by using iodine staining to provide a color change.

As would be appreciated by those skilled in the art, disinfectants that kill one type of bacteria may not have the ability to kill another type of bacteria. Further, disinfectants that kill bacteria do not always kill viruses. Therefore, it was unexpected and significant that the copolymer disclosed in the present disclosure could provide both anti-bacterial and anti-viral protection.

The disclosures being thus described, it will be obvious that the same may be varied in many ways. Such variations are not to be regarded as a departure from the spirit and scope of the disclosures and all such modifications are intended to be included within the scope of the following claims.

The invention claimed is:

1. A composition comprising:
a copolymer formed by polymerizing a monomer mixture comprising a rechargeable N-halamine moiety containing monomer, and a multifunctional crosslinker monomer comprising triglycerol diacrylate,
wherein the rechargeable N-halamine moiety is pre-activated with a halogen.

2. The composition of claim 1, wherein the halogen is selected from the group consisting of Cl, Br, and I, and the monomer mixture further comprises one or more monomers comprising a sulfonic acid acrylic monomer, an acrylate monomer, a quaternary ammonium monomer, a vinyl acetate monomer, or a combination thereof.

3. The composition of claim 2, wherein the rechargeable N-halamine moiety containing monomer comprises N-chloro-2,2,6,6-tetramethyl-4-piperidyl methacrylate, and wherein the one or more monomers comprises diallyldimethylammonium chloride, 2-acrylamido-2-methyl-1-propanesulfonic acid sodium salt, dipentaerythritol penta-/hexa-acrylate, vinyl acetate, or [3-(methacryloylamino)propyl]trimethylammonium chloride.

4. The composition of claim 1, wherein the composition is an antimicrobial composition comprising an antibacterial, antiviral, antifungal, or biofilm-controlling composition.

5. The composition of claim 4, wherein the composition is reusable as an antimicrobial composition by recharging the rechargeable N-halamine via exposure to a further halogen source resulting in re-activation of the composition as the antimicrobial composition.

6. The composition of claim 1, further comprising a coating material selected from the group consisting of a paint, a solution, a molten compound, nanoparticles, or a combination thereof.

7. A method of using a composition comprising:
receiving a copolymer composition comprising a copolymer formed by polymerizing a monomer mixture comprising a rechargeable N-halamine moiety containing monomer, and a multifunctional crosslinker monomer comprising triglycerol diacrylate, wherein the rechargeable N-halamine moiety is pre-activated with a halogen; and
applying the copolymer composition to a surface.

8. The method of claim 7, wherein the copolymer is formed by combining the rechargeable N-halamine moiety containing monomer and the multifunctional crosslinker monomer via blending, mixing, or suspending.

9. The method of claim 7, wherein the copolymer composition is sprayed onto the surface and provides antimicrobial protection for a period of at least 30 days.

10. The method of claim 7, wherein the surface is an inanimate surface.

11. The method of claim 7, wherein a halogen charge level of the rechargeable N-halamine moiety can be detected through a color change.

12. The method of claim 7, wherein the copolymer composition is incorporated as an additive to a coating material comprising a paint, a solution, a molten compound, nanoparticles, or a combination thereof prior to applying to the surface.

13. The method of claim 12, wherein the copolymer composition provides antimicrobial protection for a period of at least 90 days.

14. The method of claim 7, wherein the copolymer composition is applied in a single application step to impart antimicrobial properties without the need for exposure to an additional halogen source.

15. The method of claim 7, further comprising a step of recharging the rechargeable N-halamine moiety via exposure to a halogen source resulting in re-activation of the composition as an antimicrobial composition.

16. A treated surface, comprising:
a body comprising a treated surface comprising a copolymer composition,
wherein the copolymer composition comprises a copolymer formed by polymerizing a monomer mixture comprising a rechargeable N-halamine moiety containing monomer, and a multifunctional crosslinker monomer comprising triglycerol diacrylate; and
wherein the rechargeable N-halamine moiety is pre-activated with a halogen.

17. The treated surface of claim 16, wherein the body comprises rubber, silicone, metal, plastic, wood, vinyl, or a combination thereof.

18. The treated surface of claim 16, wherein the body is an inanimate object comprising furniture, medical equipment, a wall, a ceiling, or a combination thereof.

19. The treated surface of claim 16, wherein the copolymer composition is adhered on a surface of the body or incorporated throughout the body to form the treated surface.

20. The method of claim 16, wherein the treated surface is re-activated as an antimicrobial composition by recharging the rechargeable N-halamine moiety via exposure to a halogen source.

* * * * *